US012720114B2

(12) United States Patent
Laroche et al.

(10) Patent No.: US 12,720,114 B2
(45) **Date of Patent: *Aug. 25, 2026**

(54) HIGH LEVEL SYNTAX FOR VIDEO CODING AND DECODING

(71) Applicant: CANON KABUSHIKI KAISHA, Tokyo (JP)

(72) Inventors: Guillaume Laroche, Saint Aubin d'Aubigné (FR); Patrice Onno, Rennes (FR); Naël Ouedraogo, Val d'Anast (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,403

(22) Filed: Oct. 28, 2024

(65) Prior Publication Data

US 2025/0056057 A1 Feb. 13, 2025

Related U.S. Application Data

(63) Continuation of application No. 17/787,239, filed as application No. PCT/EP2020/087286 on Dec. 18, 2020, now Pat. No. 12,238,340.

(30) Foreign Application Priority Data

Dec. 20, 2019 (GB) ..................................... 1919035

(51) Int. Cl.
*H04N 19/82* (2014.01)
*H04N 19/105* (2014.01)
(Continued)

(52) U.S. Cl.
CPC .......... *H04N 19/70* (2014.11); *H04N 19/105* (2014.11); *H04N 19/174* (2014.11)

(58) Field of Classification Search
CPC .... H04N 19/70; H04N 19/105; H04N 19/174; H04N 19/82
See application file for complete search history.

(56) References Cited

U.S. PATENT DOCUMENTS

2021/0195247 A1* 6/2021 Li ......................... H04N 19/70

FOREIGN PATENT DOCUMENTS

CN 104396245 A 3/2015
CN 106031177 A 10/2016
WO 2020178065 A1 9/2020

OTHER PUBLICATIONS

Zhou Zuo-Cheng, et al., Key Technologies and New Developments of Next Generation Video Coding Standard HEVC, 2013 Ninth International Conference on Intelligent Information Hiding and Multimedia Signal Processing, Beijing, China, 2013.

(Continued)

*Primary Examiner* — Patrick E Demosky
(74) *Attorney, Agent, or Firm* — Canon U.S.A., Inc. IP Division

(57) ABSTRACT

A method of decoding video data from a bitstream, the bitstream comprising video data corresponding to multiple slices, wherein the bitstream comprises a header comprising syntax elements to be used when decoding one or more slices; wherein the decoding comprising parsing the picture header, parsing at least one APS ID related syntax element prior to syntax elements relating to decoding tools; and decoding said bitstream using said syntax elements.

12 Claims, 12 Drawing Sheets

(51) Int. Cl.
*H04N 19/174* (2014.01)
*H04N 19/70* (2014.01)

(56) References Cited

OTHER PUBLICATIONS

Xiaoyu Yang, et al., Optimization of motion estimation algorithm based on HEVC, Master of Engineering Thesis, Nanjing University of Posts and Telecommunications, Apr. 2018, English abstract on fifth page.

* cited by examiner

HIGH LEVEL SYNTAX FOR VIDEO CODING AND DECODING

CROSS REFERENCE TO RELATED APPLICATION

This application is a continuation of U.S. application Ser. No. 17/787,239, filed on Jun. 17, 2022, which is the National Phase application of PCT Application No. PCT/EP2020/087286, filed on Dec. 18, 2020. This application claims the benefit under 35 U.S.C. § 119 (a)-(d) of United Kingdom Patent Application No. 1919035.4, filed on Dec. 20, 2019. The above-cited patent applications are incorporated herein by reference in their entirety.

FIELD OF INVENTION

The present invention relates to video coding and decoding, and in particular to the high level syntax used in the bitstream.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include—but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools and has introduced a number of new tools. These changes have necessitated a change to the structure of the bitstream, and in particular to the high-level syntax which can have a impact on the overall bitrate of the bitstream.

One significant change to the high-level syntax is the introduction of a 'picture header' into the bitstream. A picture header is a header specifying syntax elements to be used in decoding each slice in a specific picture (or frame). The picture header is thus placed before the data relating to the slices in the bitstream, the slices each having their own 'slice header'. This structure is described in more detail below with reference to FIG. 6.

Document JVET-P0239 of the 16th Meeting: Geneva, CH, 1-11 Oct. 2019, titled 'AHG17: Picture Header' proposed the introduction of a mandatory picture header into VVC, and this was adopted as Versatile Video Coding (Draft 7), uploaded as document JVET_P2001.

However, this header has a large number of parameters, all of the which need to be parsed in order to use any specific decoding tool.

The present invention relates to an improvement to the structure of the picture header to simplify this parsing process, which leads to a reduction in complexity without any degradation in coding performance.

In particular, by setting syntax elements relating to APS ID information at the beginning of the picture header these elements can be parsed first, which may preclude the need to parse the remainder of the header.

Similarly, in the case that there are syntax elements relating to APS ID information in the slice header, these are set at the beginning of the slice header.

In one example, it is proposed to move the syntax elements related to the APS ID at an early stage of the Picture header and Slice header. The aim of this modification is to reduce the parsing complexity for some streaming applications that need to track the APS ID in the Picture header and Slice header to remove unused APS. The proposed modification has no impact on the BDR performance.

This reduces the parsing complexity for for streaming applications where the APS ID information may be all that is required from the header. Other streaming-related syntax elements may be moved towards the top of the header for the same reason.

It should be appreciated that the term 'beginning' does not mean the very first entry in the respective header as there may be a number of introductory syntax elements prior to the syntax elements relating to APS ID information. The detailed description sets out various examples, but a general definition is that the syntax elements relating to APS ID information are provided prior to syntax elements relating to decoding tool. In one particular example, the syntax elements related to the APS ID of ALF, LMCS and Scaling list are set just after the poc_msb_val syntax element.

According to an aspect of the present invention there is provided a method of decoding video data from a bitstream, the bitstream comprising video data corresponding to one or more slices, wherein the bitstream comprises a header comprising syntax elements to be used when decoding one or more slices; wherein the decoding comprising parsing, from the header; at least one syntax element relating to APS ID decoding tools prior to parsing syntax elements dedicated to decode decoding tools; and decoding said bitstream using said syntax elements.

In another aspect of the present invention there is provided method of encoding video data into a bitstream, the bitstream comprising video data corresponding to one or more slices, wherein the bitstream comprises a header comprising syntax elements to be used when decoding one or more slices; the encoding comprising encoding the header with at least one syntax element relating to APS ID decoding tools prior to syntax elements dedicated to decode decoding tools.

Optional features of both the preceding method of decoding and method of encoding aspects follow.

Optionally, the header is a picture header comprising syntax elements to be used when decoding multiple slices in a picture.

Optionally, the at least one APS ID related syntax elements are after a syntax element indicating that the current picture is never used as a reference picture.

Optionally, the at least one APS ID related syntax elements are after a syntax element indicating that the current picture is a gradual decoding refresh picture.

Optionally, the at least one APS ID related syntax elements are after a syntax element indicating a change in the previously decoded pictures in the decoding picture buffer.

Optionally, the at least one APS ID related syntax elements are after picture type information.

Optionally, the at least one APS ID related syntax elements are after picture parameter set information.

Optionally, the header is a slice header. Optionally, the at least one APS ID related syntax elements are after subpicture information.

Optionally the at least one APS ID related syntax elements are after a syntax element which indicates the subpicture ID of the current slice.

Optionally, the at least one APS ID related syntax elements are after a syntax element which indicates the address of the slice.

Optionally, the at least one APS ID related syntax elements are after a syntax element indicating that the number of tiles in the slice.

Optionally, the at least one APS ID related syntax elements are after a syntax element which indicates the type of the current slice.

Optionally, the syntax elements dedicated to decode decoding tools comprise low-level tool parameters.

Optionally, the low-level tool parameters comprise a deblocking filter parameter.

Optionally, the low-level tool parameters comprise a quantization parameter.

Optionally, the low-level tool parameters comprise an SAO parameter.

Optionally, the low-level tool parameters comprise a syntax element indicating that the sign of residual samples of two colours have inverted sign.

Optionally, the low-level tool parameters comprise a motion parameter.

Optionally, the low-level tool parameters comprise a QP offset parameter.

Optionally, the low-level tool parameters comprise a partitioning parameter.

Optionally, the low-level tool parameters comprise a reference picture list parameter.

Optionally, the low-level tool parameters comprise a syntax element indicating that the current picture is an output picture.

Optionally, the low-level tool parameters comprise a syntax element indicating that the colour plane index.

Optionally, the low-level tool parameters comprise a CABAC initialisation flag.

Optionally, the low-level tool parameters comprise a collocated prediction parameter.

Optionally, the low-level tool parameters comprise a weighted prediction parameter.

Optionally, the at least one APS ID related syntax elements comprises APS ID LMCS.

Optionally, the at least one APS ID related syntax elements comprises APS ID scaling list.

Optionally, the APS scaling list contains information to enable the scaling matrix for the LNST method.

Optionally, the at least one APS ID related syntax elements comprises APS ID ALF list.

Optionally, the APS ALF list contains information related to the signaling of clipping values.

According to an aspect of the invention there is provided a method of encoding video data into a bitstream, the bitstream comprising video data corresponding to multiple pictures and APS transmission; the encoding comprising: signalling the presence of a resynchronisation picture into the bitstream, resetting the APS ID based on said signalling so that the APS ID of a previous picture is not used in a subsequent picture.

Optionally, determining whether the picture relates to a resynchronisation process comprises determining if the picture is an IRAP or GDR picture.

According to an aspect of the invention there is provided a decoder for decoding video data from a bitstream, the bitstream comprising video data corresponding to one or more slices, wherein the bitstream comprises a header comprising syntax elements to be used when decoding one or more slices; wherein the decoder comprises: means for parsing, from the header at least one syntax element relating to APS ID decoding tools prior to parsing syntax elements dedicated to decoding tools; and means for decoding said bitstream using said syntax elements.

According to an aspect of the invention there is provided an encoder for encoding video data into a bitstream, the bitstream comprising video data corresponding to one or more slices, wherein the bitstream comprises a header comprising syntax elements to be used when decoding one or more slices; the encoder comprising: means for encoding the header with at least one syntax element relating to APS ID decoding tools prior to syntax elements dedicated to decode decoding tools.

According to a yet further aspect of the invention there is provided an encoder for encoding video data into a bitstream, the bitstream comprising video data corresponding to multiple pictures and APS transmission; the encoder comprising: means for signalling the presence of a resynchronisation picture into the bitstream, and means for resetting the APS ID based on said signalling so that the APS ID of a previous picture is not used in a subsequent picture.

In another aspect of the invention there is provided a computer readable storage medium storing a program or instructions which, when executed by a programmable apparatus, causes the programmable apparatus to perform a method according to any of the above mentioned method aspects.

According to one aspect of the present invention there is provided a method of decoding video data from a bitstream, the bitstream comprising video data corresponding to multiple slices, wherein the bitstream comprises a header comprising syntax elements to be used when decoding one or more slices; wherein the decoding comprising parsing the picture header; parsing at least one APS ID related syntax element prior to syntax elements relating to decoding tools; and decoding said bitstream using said syntax elements.

This affords a simpler and faster parsing process, in particular for streaming applications.

In a related aspect of the present invention there is provided a method of encoding video data into a bitstream, the bitstream comprising video data corresponding to multiple slices, wherein the bitstream comprises a header comprising syntax elements to be used when decoding one or more slices; the encoding comprising encoding the picture header with APS ID related syntax elements prior to syntax elements relating to decoding tools.

Optionally, the at least one APS ID related syntax elements comprises APS ID LMCS.

Optionally, the at least one APS ID related syntax elements comprises APS ID scaling list.

Optionally, the APS scaling list contains information to enable the scaling matrix for the LNST method.

Optionally, the at least one APS ID related syntax elements comprises APS ID ALF list. Preferably wherein the APS ALF list contains information related to the signaling of clipping values.

To reduce the complexity of parsing, the at least one APS ID related syntax elements may be after syntax elements which are independent of values from any other header.

Optionally, the header is a picture header comprising syntax elements to be used when decoding multiple slices in a picture.

Optionally, the at least one APS ID related syntax elements are after one or more of: a syntax element indicating that the current picture is never used as a reference picture, a syntax element indicating that the current picture is a gradual decoding refresh picture, a syntax element indicating a change in the previously decoded pictures in the decoding picture buffer, picture parameter set information, subpicture information, or picture type information.

For ease of parsing, the at least one APS ID related syntax elements may be after fixed length syntax elements. This allows the APS ID related syntax elements to be parsed first as they are always in the same location in the header.

Optionally, the syntax elements relating to decoding tools comprise low level tool parameters.

Optionally, the low level tool parameters comprise one or more of: a deblocking filter parameter, a quantization parameter, an SAO parameter, a syntax element indicating that the sign of residual samples of two colours have inverted sign, a motion parameter, a QP offset parameter, a partitioning parameter, a reference picture list parameter, a syntax element indicating that the current picture is an output picture, or a syntax element indicating that the colour plane index.

Optionally, the method further comprises determining whether the picture relates to a resynchronisation process, and if so, the decoding comprises resetting the APS ID.

According to another aspect of the present invention there is provided a method of decoding video data from a bitstream, the bitstream comprising video data corresponding to multiple slices, wherein the bitstream comprises a header comprising syntax elements to be used when decoding one or more slices; wherein the decoding comprising parsing the picture header; determining whether the picture relates to a resynchronisation process based on a signal in the bitstream, and if so, the decoding comprises resetting the APS ID.

This provides flexibility for use of resynchronisation frames while simplifying the parsing process.

Optionally, the APS related to the APS ID are not used in the decoding process of the future decoded pictures.

According to another aspect of the present invention there is provided a method of encoding video data into a bitstream, the bitstream comprising video data corresponding to multiple pictures and APS transmission; the encoding comprising: signalling the presence of a resynchronisation picture into the bitstream, resetting the APS ID based on said signalling so that the APS ID of a previous picture is not used in a subsequent picture.

Optionally, determining whether the picture relates to a resynchronisation process comprises determining if the picture is an IRAP or GDR picture.

Optionally, the header is a slice header.

Optionally, the at least one APS ID related syntax elements are after one or more of: a syntax element which indicates POC of the current slice, a syntax element which indicates the sub-picture ID of the current slice, a syntax element which indicates the address of the slice, a syntax element indicating that the number of tiles in the slice, or a syntax element which indicates the type of the current slice.

Optionally, the syntax elements relating to decoding tools comprise low level tool parameters.

Optionally, the low-level tool parameters comprise one or more of: a reference picture list parameter, a CABAC initialisation flag, a collocated prediction parameter, a weighted prediction parameter, a QP parameter or a SAO parameter.

Yet further aspects of the present invention relate to an encoder and a decoder as defined for performing the above mention methods of encoding and decoding respectively.

Yet further aspects of the present invention relate to a program which upon execution causes a method of any above described method aspect to be performed. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

Reference will now be made, by way of example, to the accompanying drawings, in which.

DETAILED DESCRIPTION

Figure 1:
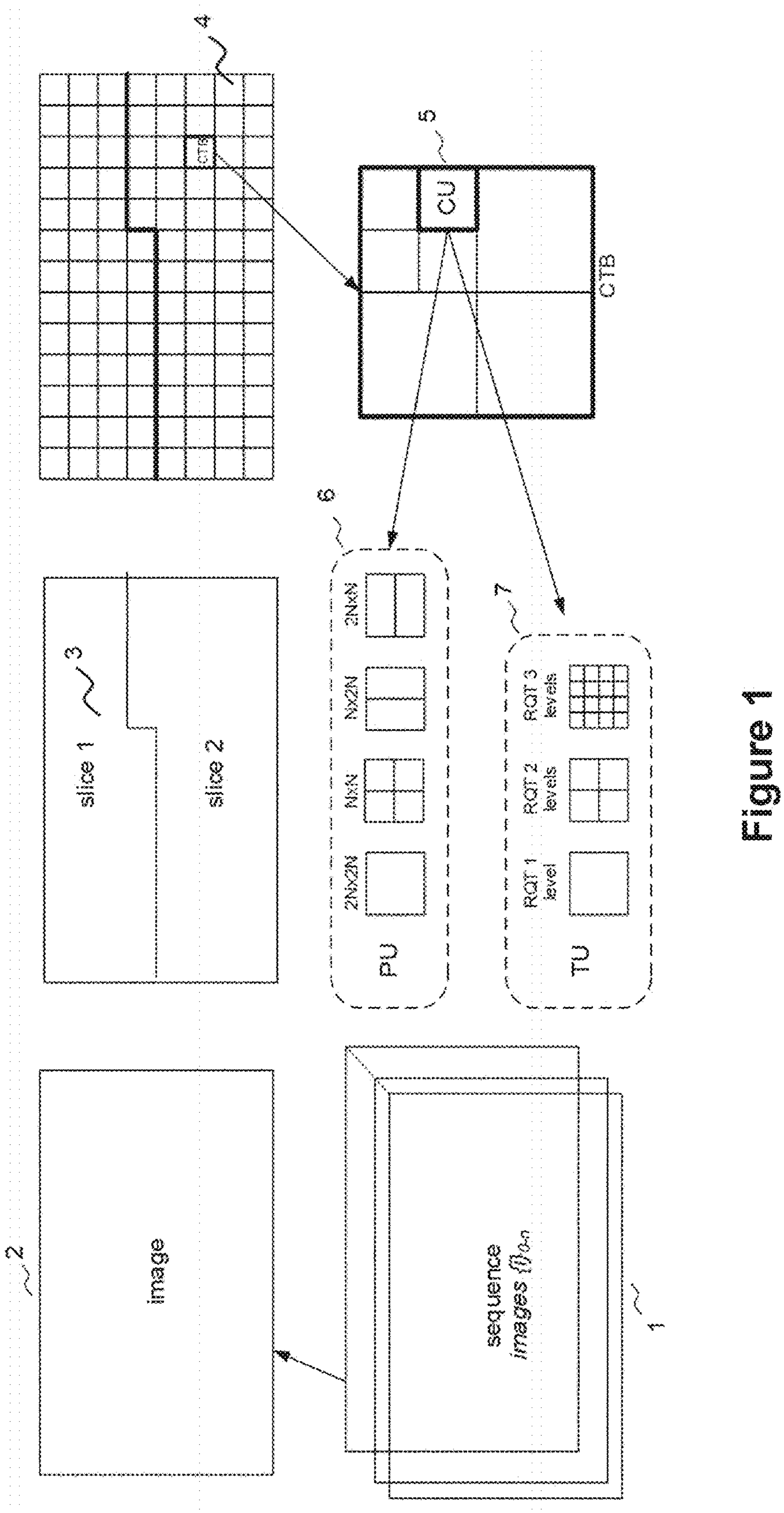
FIG. 1 is a diagram for use in explaining a coding structure used in HEVC and VVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Figure 2:
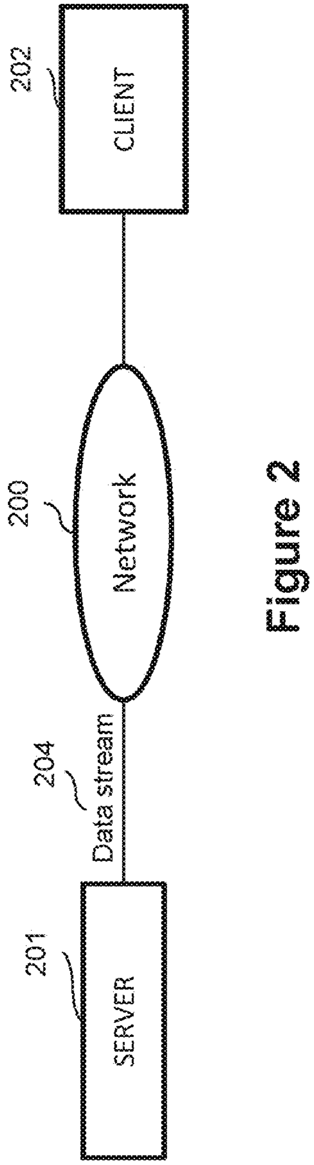
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
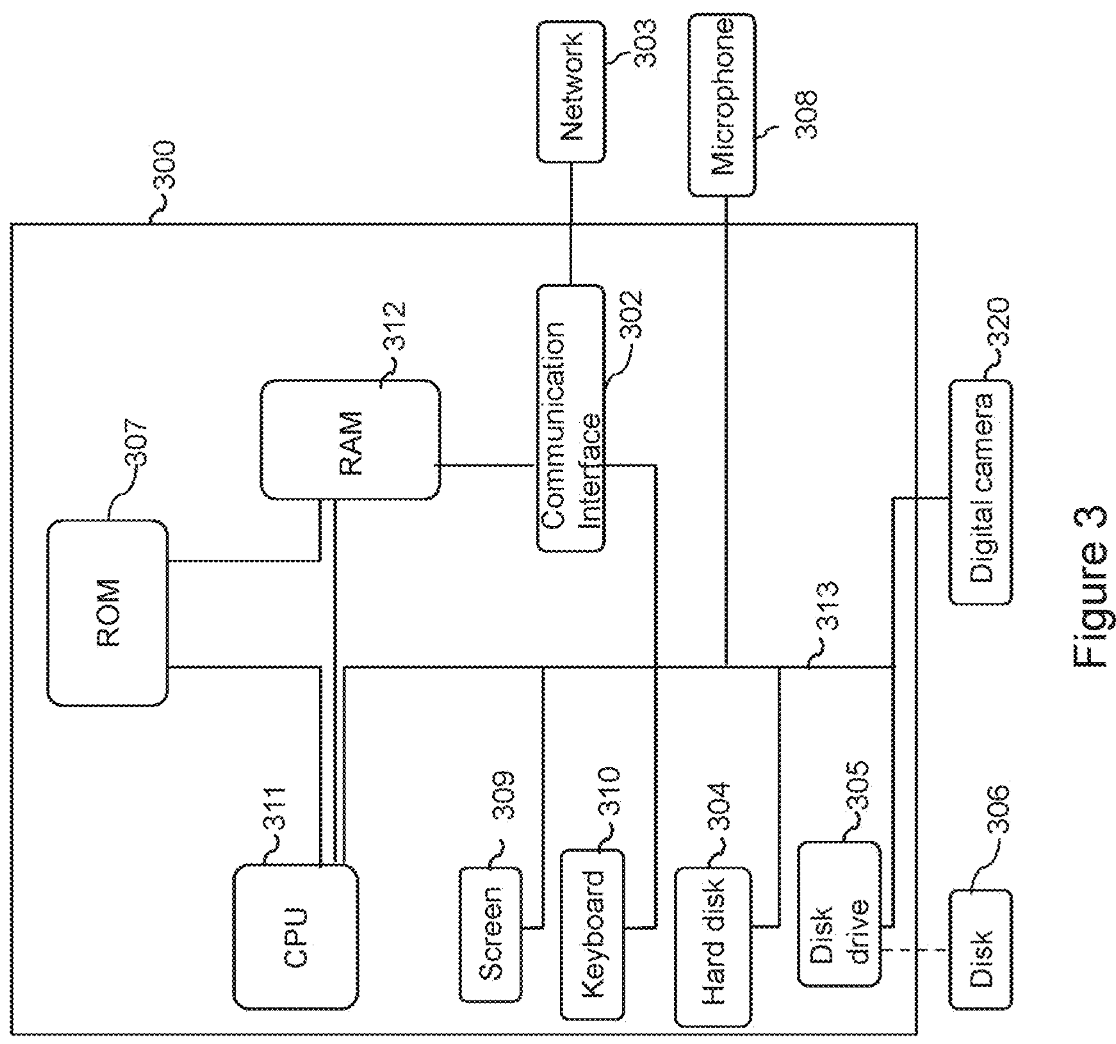
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

- a central processing unit 311, such as a microprocessor, denoted CPU;
- a read only memory 306, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received Optionally, the apparatus 300 may also include the following components:

- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk;
- a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
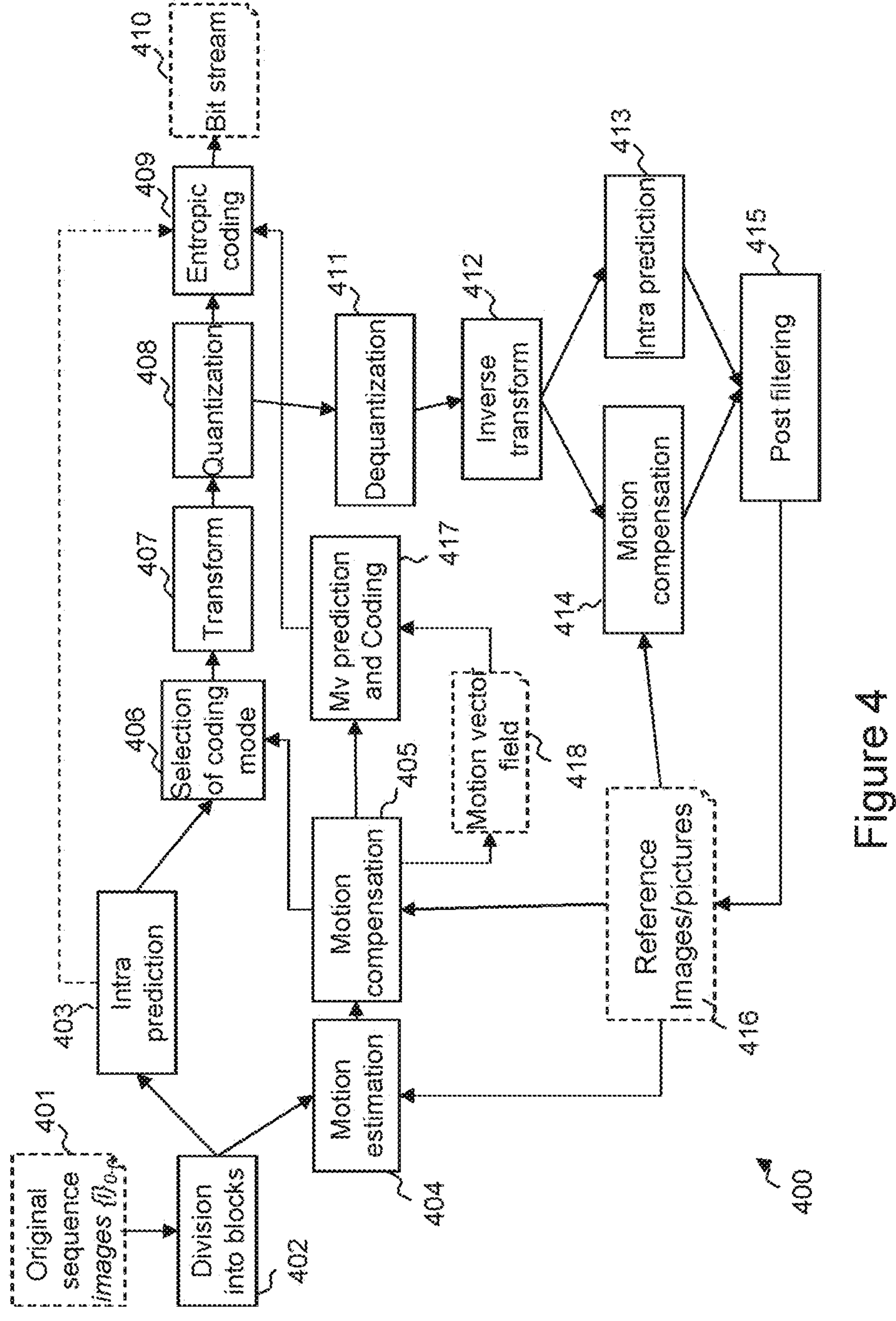
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, known as pixels.

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus, in both cases (spatial and temporal prediction), a residual is computed by subtracting the prediction from the original block.

In the INTRA prediction implemented by module 403, a prediction direction is encoded. In the temporal prediction, at least one motion vector is encoded. In the Inter prediction implemented by modules 404, 405, 416, 418, 417, at least one motion vector or data for identifying such motion vector is encoded for the temporal prediction.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416.

Figure 5:
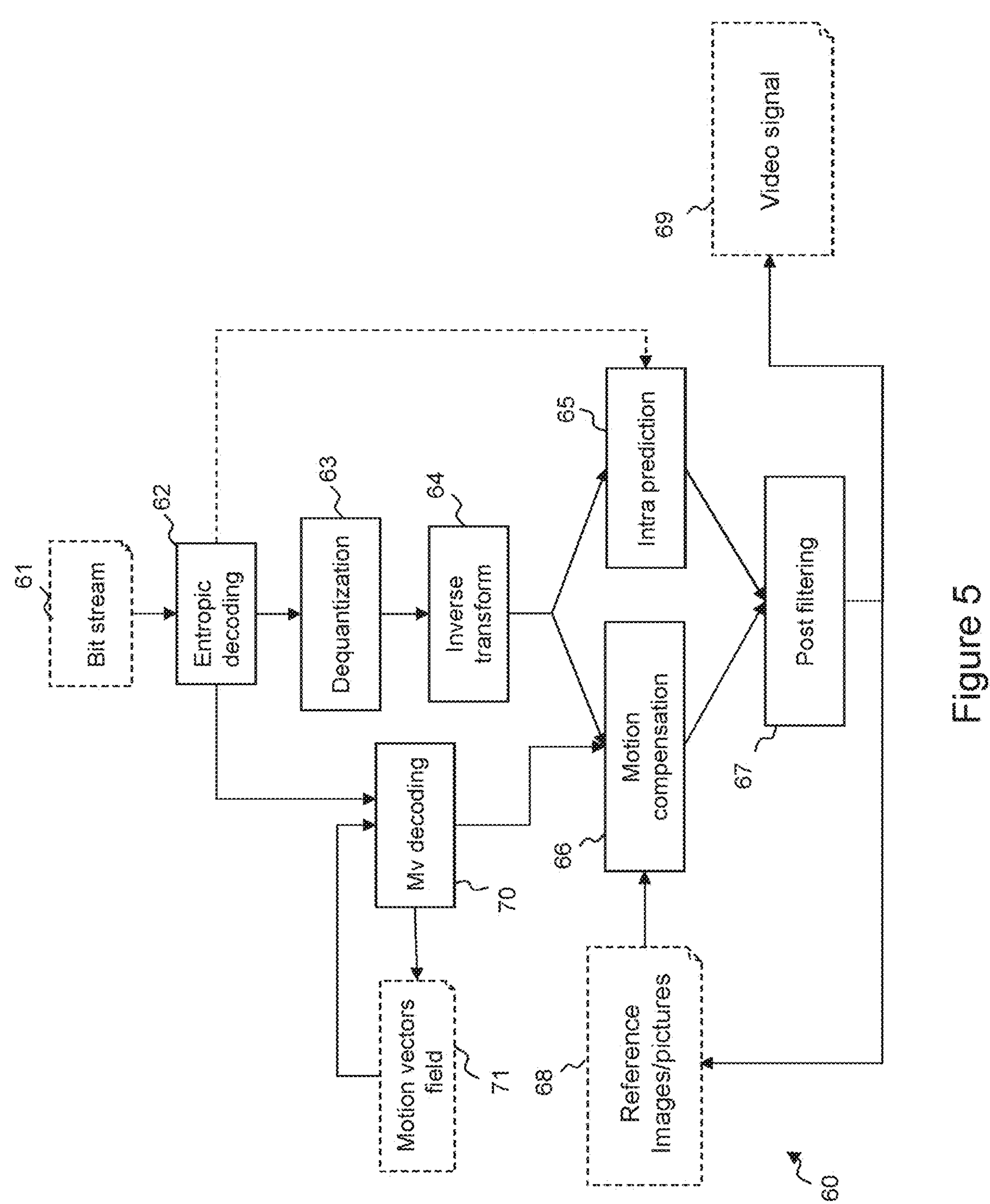
FIG. 5 is a flow chart illustrating steps of a decoding method according to embodiments of the invention.

Post filtering is then applied by module 415 to filter the reconstructed frame of pixels. In the embodiments of the invention an SAO loop filter is used in which compensation offsets are added to the pixel values of the reconstructed pixels of the reconstructed image FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoding units, each one being composed of a header containing information on encoding parameters and a body containing the encoded video data. The structure of the bitstream in VVC is described in more detail below with reference to FIG. 6. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then a reverse transform is applied by module 64 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 65 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 70.

Motion vector decoding module 70 applies motion vector decoding for each current block encoded by motion prediction. Once an index of the motion vector predictor, for the current block has been obtained the actual value of the motion vector associated with the current block can be decoded and used to apply reverse motion compensation by module 66. The reference image portion indicated by the decoded motion vector is extracted from a reference image 68 to apply the reverse motion compensation 66. The motion vector field data 71 is updated with the decoded motion vector in order to be used for the inverse prediction of subsequent decoded motion vectors.

Finally, a decoded block is obtained. Post filtering is applied by post filtering module 67. A decoded video signal 69 is finally provided by the decoder 60.

Figure 6:
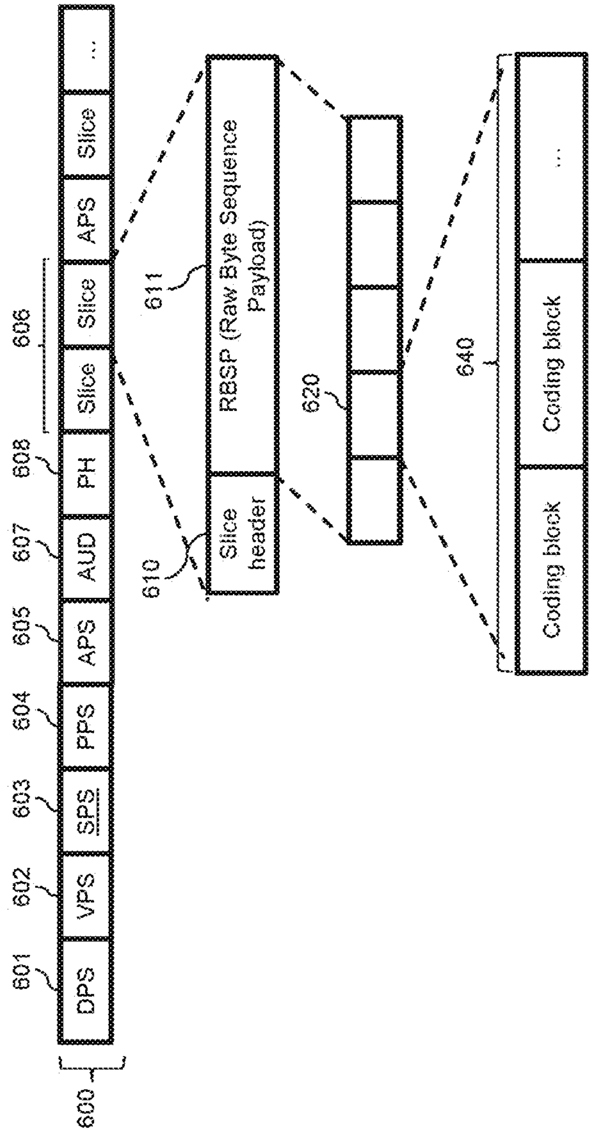
FIG. 6 illustrates the structure of the bitstream in the exemplary coding system VVC

FIG. 6 illustrates the organisation of the bitstream in the exemplary coding system VVC as describe in JVET_P2001-VE.

A bitstream 61 according to the VVC coding system is composed of an ordered sequence of syntax elements and coded data. The syntax elements and coded data are placed into Network Abstraction Layer (NAL) units 601-608. There are different NAL unit types. The network abstraction layer provides the ability to encapsulate the bitstream into different protocols, like RTP/IP, standing for Real Time Protocol/Internet Protocol, ISO Base Media File Format, etc. The network abstraction layer also provides a framework for packet loss resilience.

NAL units are divided into Video Coding Layer (VCL) NAL units and non-VCL NAL units. The VCL NAL units contain the actual encoded video data. The non-VCL NAL units contain additional information. This additional information may be parameters needed for the decoding of the encoded video data or supplemental data that may enhance usability of the decoded video data. NAL units 606 correspond to slices and constitute the VCL NAL units of the bitstream.

Different NAL units 601-605 correspond to different parameter sets, these NAL units are non-VCL NAL units. The Decoder Parameter Set (DPS) NAL unit 301 contains parameters that are constant for a given decoding process. The Video Parameter Set (VPS) NAL unit 602 contains parameters defined for the whole video, and thus the whole bitstream. The DPS NAL unit may define parameters more static than the parameters in the VPS. In other words, the parameters of DPS change less frequently than the parameter of the VPS.

The Sequence Parameter Set (SPS) NAL unit 603 contains parameters defined for a video sequence. In particular, the SPS NAL unit may define the sub pictures layout and associated parameters of the video sequences. The parameters associated to each subpicture specifies the coding constraints applied to the subpicture. In particular, it comprises a flag indicating that the temporal prediction between subpictures is restricted to the data coming from the same subpicture. Another flag may enable or disable the loop filters across the subpicture boundaries.

The Picture Parameter Set (PPS) NAL unit 604, PPS contains parameters defined for a picture or a group of pictures. The Adaptation Parameter Set (APS) NAL unit 605, contains parameters for loop filters typically the Adaptive Loop Filter (ALF) or the reshaper model (or luma mapping with chroma scaling (LMCS) model) or the scaling matrices that are used at the slice level.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units. The PPS as the APS have an ID mechanism to limit the amount of same PPS transmitted.

The main difference between the PPS and Picture Header is it transmission, the PPS is generally transmitted for a group of pictures compared to the PH which is systematically transmitted for each Picture. So the PPS compared to the PH contains parameters which can be constant for several picture.

The bitstream may also contain Supplemental Enhancement Information (SEI) NAL units (not represented in FIG. 6). The periodicity of occurrence of these parameter sets in the bitstream is variable. A VPS that is defined for the whole bitstream may occur only once in the bitstream. To the contrary, an APS that is defined for a slice may occur once for each slice in each picture. Actually, different slices may rely on the same APS and thus there are generally fewer APS than slices in each picture. In particular, the APS are defined in the picture header. Yet, the ALF APS can be refined in the slice header.

The Access Unit Delimiter (AUD) NAL unit 607 separates two access units. An access unit is a set of NAL units which may comprise one or more coded pictures with the same decoding timestamp. This optional NAL unit contains only one syntax element in current VVC specification: pic_type, this syntax element. indicates that the slice_type values for all slices of the coded pictures in the AU. If pic_type is set equal to 0, the AU contain only Intra slice. If equal to 1, it contains P and I slices. If equal to 2 it contains B, P or Intra slice This NAL unit contains only one syntax element the pic-type.

TABLE 1

| Syntax AUD | |
|---|---|
| | Descriptor |
| access_unit_delimiter_rbsp( ) { | |
| pic_type | u(3) |
| rbsp_trailing_bits( ) | |
| } | |

In JVET-P2001-vE the pic_type is defined as follow:

"pic_type indicates that the slice_type values for all slices of the coded pictures in the AU containing the AU delimiter NAL unit are members of the set listed in Table 2 for the given value of pic_type. The value of pic_type shall be equal to 0, 1 or 2 in bitstreams conforming to this version of this Specification. Other values of pic_type are reserved for future use by ITU-T|ISO/IEC. Decoders conforming to this version of this Specification shall ignore reserved values of pic_type."

TABLE 2

| Interpretation of pic_type | |
|---|---|
| pic_type | slice_type values that may be present in the AU |
| 0 | I |
| 1 | P, I |
| 2 | B, P, I |

The PH NAL unit 608 is the Picture Header NAL unit which groups parameters common to a set of slices of one coded picture. The picture may refer to one or more APS to indicate the AFL parameters, reshaper model and the scaling matrices used by the slices of the Picture.

Each of the VCL NAL units 606 contains a slice. A slice may correspond to the whole picture or sub picture, a single tile or a plurality of tiles or a fraction of a tile. For example the slice of the FIG. 3 contains several tiles 620. A slice is composed of a slice header 610 and a raw byte sequence payload, RBSP 611 that contains the coded pixels data encoded as coded blocks 640.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units.

NAL Unit Slice

The NAL unit slice layer contains the slice header and the slice data as illustrated in Table 3.

TABLE 3

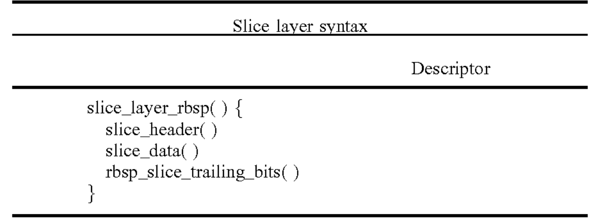

| Slice layer syntax | |
|---|---|
| | Descriptor |
| slice_layer_rbsp( ) { | |
| slice_header( ) | |
| slice_data( ) | |
| rbsp_slice_trailing_bits( ) | |
| } | |

APS

The Adaptation Parameter Set (APS) NAL unit 605, is defined in Table 4 showing the syntax elements.

As depicted in table Table 4, there are 3 possible types of APS given by the aps_params_type syntax element:

ALF_AP: for the ALF parameters

LMCS_APS for the LMCS parameters

SCALING_APS for Scaling list relative parameters

TABLE 4

| Adaptation parameter set syntax | |
|---|---|
| | Descriptor |
| adaptation_parameter_set_rbsp( ) { | |
| adaptation_parameter set id | u(5) |
| aps_params_type | u(3) |
| if( aps_params_type = = ALF APS ) | |
| alf data( ) | |
| else if( aps_params_type = = LMCS_APS ) | |
| lmcs_data( ) | |
| else if( aps_params_type = = SCALING_APS ) | |
| scaling_list_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | |

These three types of APS parameters are discussed in turn below

ALF APS

The ALF parameters are described in Adaptive loop filter data syntax elements (Table 5). First, two flags are dedicated to specify whether or not the ALF filters are transmitted for Luma and/or for Chroma. If the Luma filter flag is enabled, another flag is decoded to know if the clip values are signalled (alf_luma_clip_flag). Then the number of filters signalled is decoded using the alf_luma_num_filters_signalled_minus1 syntax element. If needed, the syntax element representing the ALF coefficients delta "alf_luma_coeff_delta_idx" is decoded for each enabled filter. Then absolute value and the sign for each coefficient of each filter are decoded.

If the alf_luma_clip_flag is enabled, the clip index for each coefficient of each enabled filter is decoded.

In the same way, the ALF chroma coefficients are decoded if needed.

TABLE 5

| Adaptive loop filter data syntax | |
|---|---|
| | Descriptor |
| alf_data( ) { | |
| alf_luma_filter_signal_flag | u(1) |
| alf_chroma_filter_signal_flag | u(1) |
| if( alf_luma_filter_signal_flag ) { | |
| alf_luma_clip_flag | u(1) |
| alf_luma_num_filters_signalled_minus1 | ue(v) |
| if( alf_luma_num_filters_signalled_minus1 > 0 ) { | |
| for( filtIdx = 0; filtIdx < NumAlfFilters; filtIdx++ ) | |
| alf_luma_coeff_delta_idx[ filtIdx ] | u(v) |
| } | |
| for( sfIdx = 0; sfIdx <= alf_luma_num_filters_signalled_minus1; sfIdx++ ) { | |
| for( j = 0; j < 12; j++ ) { | |
| alf_luma_coeff_abs[ sfIdx ][ j ] | uek(v) |
| if( alf_luma_coeff_abs[ sfIdx ][ j ] ) | |
| alf_luma_coeff_sign[ sfIdx ][ j ] | u(1) |
| } | |
| } | |
| if( alf_luma_clip_flag ) { | |
| for( sfIdx = 0; sfIdx <= alf_luma_num_filters_signalled_minus1; sfIdx++ ) { | |
| for( j = 0; j < 12; j++ ) | |
| alf_luma_clip_idx[ sfIdx ][ j ] | u(2) |
| } | |
| } | |
| } | |
| if( alf_chroma_filter_signal_flag ) { | |
| alf_chroma_num_alt_filters_minus1 | ue(v) |
| for( altIdx = 0; altIdx <= alf_chroma_num_alt_filters_minus1; altIdx++ ) { | |
| alf_chroma_clip_flag[ altIdx ] | u(1) |
| for( j = 0; j < 6; j++ ) { | |
| alf_chroma_coeff_abs[ altIdx ][ j ] | uek(v) |
| if( alf_chroma_coeff_abs[ altIdx ][ j ] > 0 ) | |
| alf_chroma_coeff_sign[ altIdx ][ j ] | u(1) |
| } | |
| if( alf_chroma_clip_flag[ altIdx ] ) { | |
| for(j = 0; j < 6; j++ ) | |
| alf_chroma_clip_idx[ altIdx ][ j ] | u(2) |
| } | |
| } | |
| } | |
| } | |

LMCS Syntax Elements for Both Luma Mapping and Chroma Scaling

The Table 6 below gives all the LMCS syntax elements which are coded in the adaptation parameter set (APS) syntax structure when the aps_params_type parameter is set to 1 (LMCS_APS). Up to four LMCS APS's can be used in a coded video sequence however only a single LMCS APS can be used for a given picture.

These parameters are used to build the forward and inverse mapping functions for Luma and the scaling function for Chroma.

TABLE 6

| Luma mapping with chroma scaling data syntax | |
|---|---|
| | Descriptor |
| lmcs_data ( ) { | |
| lmcs_min_bin_idx | ue(v) |
| lmcs_delta_max_bin_idx | ue(v) |
| lmcs_delta_cw_prec_minus1 | ue(v) |
| for( i = lmcs_min_bin_idx; i <= LmcsMaxBinIdx; i++ ) { | |
| lmcs_delta_abs_cw[ i ] | u(v) |
| if( lmcs_delta_abs_cw[ i ]) > 0 ) | |
| lmcs_delta_sign_cw_flag[ i ] | u(1) |
| } | |
| lmcs_delta_abs_crs | u(3) |
| if( lmcs_delta_abs_crs) > 0 ) | |
| lmcs_delta_sign_crs_flag | u(1) |
| } | |

Scaling List APS

The scaling list offers the possibility to update the quantization matrix used for quantification. In VVC this scaling matrix is s in the APS as described in Scaling list data syntax elements (Table 7). This syntax specifies if the scaling matrix are used for the LFNST (Low Frequency Non-Separable Transform) tool based on the flag scaling_matrix_for_lfnst_disabled_flag. Then the syntax elements needed to build the scaling matrix are decoded (scaling_list_copy_mode_flag, scaling_list_pred_mode_flag, scaling_list_pred_id_delta, scaling_list_dc_coef, scaling_list_delta_coef).

TABLE 7

| Scaling list data syntax | |
|---|---|
| | Descriptor |
| scaling_list_data( ) { | |
| scaling_matrix_for_lfnst_disabled_flag | u(1) |
| for(id = 0; id < 28; id ++ ) | |
| matrixSize = (id < 2) ? 2 : ( ( id < 8) ? 4 : 8 ) | |
| scaling_list_copy_mode_flag[ id ] | u(1) |
| if( !scaling_list_copy_mode_flag[ id ] ) | |
| scaling_list_pred_mode_flag[ id ] | u(1) |
| if( ( scaling_list_copy_mode_flag[ id ] \|\| scaling_list_pred_mode_flag [ id ] ) && | |
| id != 0 && id != 2 && id != 8 ) | |
| scaling_list_pred_id_delta[ id ] | ue(v) |
| if( !scaling_list_copy_mode_flag[ id ] ) { | |
| nextCoef = 0 | |
| if( id > 13 ) { | |
| scaling_list_dc_coef[ id − 14 ] | se(v) |
| nextCoef += scaling_list_dc_coef[ id − 14 ] | |
| } | |

TABLE 7-continued

| Scaling list data syntax | |
|---|---|
| | Descriptor |
| for( i = 0; i < matrixSize * matrixSize; i++ ) { | |
| x = DiagScanOrder[ 3 ][ 3 ][ i ][ 0 ] | |
| y = DiagScanOrder[ 3 ][ 3 ][ i ][ 1 ] | |
| if( !( id > 25 && x >= 4 && y >= 4 ) ) { | |
| scaling_list_delta_coef[ id ][ i ] | se(v) |
| nextCoef += scaling_list_delta_coef[ id ][ i ] | |
| } | |
| ScalingList[ id ][ i ] = nextCoef | |
| } | |
| } | |
| } | |
| } | |

Picture Header

The picture header is transmitted at the beginning of each picture. The picture header table syntax currently contains 82 syntax elements and about 60 testing conditions or loops. This is very large compared to the previous headers in the previous drafts of the standard. A complete description of all these parameters can be found in JVET_P2001-VE. Table 8 shows these parameters in the current picture header decoding syntax. In this simplified table version, some syntax elements have been grouped for ease of reading.

The related syntax elements which can be decoded are related to:

- the usage of this picture, reference frame or not output frame
- subpicture usage if needed
- reference picture list if needed
- colour plane if needed
- partitioning update if overriding flag is enabled
- delta QP parameters if needed
- Motion information parameters if needed
- ALF parameters if needed
- SAO parameters if needed
- quantification parameters if needed
- LMCS parameters if needed
- Scaling list parameters if needed
- picture header extension if needed The three first flags, with a fixed length, are the non_reference_picture_flag, gdr_pic_flag, no_output_of_prior pics flag giving the information related to the picture characteristics inside the bitstream.

Then if the gdr_pic_flag is enabled the recovery_poc_cnt is decoded.

The PPS parameters "PS_parameters( )" set the PPS ID and some other information if needed.

It contains three syntax elements:

- ph_pic_parameter_set_id
- ph_poc_msb_present_flag
- poc_msb_val

The Subpicture parameters Subpic_parameter( ) are enabled when they are enabled at SPS and if the subpicture id signalling is disabled. It also contains some information on virtual boundaries. For the sub picture parameters eight syntax elements are defined:

- ph_subpic_id_signalling_present_flag
- ph_subpic_id_len_minus1
- ph_subpic_id
- ph_loop_filter_across_virtual_boundaries_disabled_present_flag
- ph_num_ver_virtual_boundaries
- ph_virtual_boundaries_pos_x
- ph_num_hor_virtual_boundaries
- ph_virtual_boundaries_pos_y Then, the colour plane id "colour_plane_id" is decoded if the sequence contains separate colour planes, followed by the pic_output_flag if present.

Then the parameters for the reference picture list are decoded "reference_picture_list_parameters( )" it contains the following syntax elements:

- pic_rpl_present_flag
- pic_rpl_sps_flag
- pic_rpl_idx
- pic_poc_lsb_lt
- pic_delta_poc_msb_present_flag
- pic_delta_poc_msb_cycle_lt If needed, another group of syntax elements related to the reference picture list structure "ref_pic_list_struct" which contains eight other syntax elements can also be decoded.

The set of partitioning parameters "partitioning_parameters( )" is decoded if needed and contains the following 13 syntax elements:

- partition_constraints_override_flag
- pic_log2_diff_min_qt_min_cb_intra_slice_luma
- pic_log2_diff_min_qt_min_cb_inter_slice
- pic_max_mtt_hierarchy_depth_inter_slice
- pic_max_mtt_hierarchy_depth_intra_slice_luma
- pic_log2_diff_max_bt_min_qt_intra_slice_luma
- pic_log2_diff_max_tt_min_qt_intra_slice_luma
- pic_log2_diff_max_bt_min_at_inter_slice
- pic_log2_diff_max_tt_min_qt_inter_slice
- pic_log2_diff_min_qt_min_cb_intra_slice_chroma
- pic_max_mtt_hierarchy_depth_intra_slice_chroma
- pic_log2_diff_max_bt_min_qt_intra_slice_chroma
- pic_log2_diff_max_tt_min_at_intra_slice_chroma After these partitioning parameters, the four delta QP syntax elements "Delta_QP_Parameters( )" may be decoded if needed:

- pic_cu_qp_delta_subdiv_intra_slice
- pic_cu_qp_delta_subdiv_inter_slice
- pic_cu_chroma_qp_offset_subdiv_intra_slice
- pic_cu_chroma_qp_offset_subdiv_inter_slice The pic_joint_cbcr_sign_flag is then decoded if needed followed by the set of 3 SAO syntax elements "SAO_parameters( )":

- pic_sao_enabled_present_flag
- pic_sao_luma_enabled_flag
- pic_sao_chroma_enabled_flag Then the set of ALF APS id syntax elements are decoded if ALF is enabled at SPS level.

First the pic_alf_enabled_present_flag is decoded to determine whether or not if the pic_alf_enabled_flag should be decoded. if the pic_alf_enabled_flag is enabled, ALF is enabled for all slices of the current picture.

If ALF is enabled, the amount of ALF APS id for luma is decoded using the pic_num_alf_aps_ids_luma syntax element. For each APS id, the APS id value for Luma is decoded "pic_alf_aps_id_luma".

For chroma the syntax element, pic_alf_chroma_idc is decoded to determine whether or not ALF is enabled for Chroma, for Cr only, or for Cb only. If it is enabled, the value of the APS Id for Chroma is decoded using the pic_alf_aps_id_chroma syntax element.

After the set of ALF APS id parameters the quantization parameters for the picture header are decoded if needed:

pic_dep_quant_enabled_flag
sign_data_hiding_enabled_flag

The set of three deblocking filter syntax elements "deblocking_filter_parameters( )" are then decoded if needed:

pic_deblocking_filter_override_present_flag
pic_deblocking_filter_override_flag
pic_deblocking_filter_disabled_flag
pic_beta_offset_div2
pic_tc_offset_div2

The set of LMCS APS ID syntax elements is decoded after if LMCS was enabled at SPS. First the pic_lmcs_enabled_flag is decoded to determine whether or not LMCS is enabled for the current picture. If LMCS is enabled, the Id value is decoded pic_lmcs_aps_id. For Chorma only the pic_chroma_residual_scale_flag is decoded to enable or disable the method for Chroma.

The set of scaling list APS ID is then decoded if the scaling list is enabled at SPS level. The pic_scaling_list_present_flag is decoded to determine whether or not the scaling matrix is enabled for the current picture. And the value of the APS ID, pic_scaling_list_aps_id, is then decoded.

Finally, the picture header extension syntax elements are decoded if needed.

TABLE 8

| Partial Picture header | Descriptor |
|---|---|
| picture_header_rbsp( ) { | |
| non_reference_picture_flag | u(1) |
| gdr_pic_flag | u(1) |
| no_output_of_prior_pics_flag | u(1) |
| if( gdr_pic_flag ) | |
| recovery_poc_cnt | ue(v) |
| PPS_parameters( ) | |
| Subpic_parameter( ) | |
| if( separate_colour_plane_flag = = 1) | |
| colour_plane_id | u(2) |
| if( output_flag_present_flag ) | |
| pic_output_flag | u(1) |
| reference_picture_list_parameters( ) | |
| partitioning_parameters( ) | |
| Delta_QP_Parameters( ) | |
| Motion_information_Parameters( ) | |
| if( sps_joint_cbcr_enabled_flag ) | |
| pic_joint_cbcr_sign_flag | u(1) |
| SAO_parameters( ) | |
| if( sps_alf_enabled_flag ) { | |
| pic_alf_enabled_present_flag | u(1) |
| if( pic_alf_enabled_present_flag ) { | |
| pic_alf_enabled_flag | u(1) |
| if( pic_alf_enabled_flag ) { | |
| pic_num_alf_aps_ids_luma | u(3) |
| for( i = 0; i < pic_num_alf_aps_ids_luma; i++) | |
| pic_alf_aps_id_luma[ i ] | u(3) |
| if( ChromaArrayType != 0) | |
| pic_alf_chroma_idc | u(2) |
| if( pic_alf_chroma_idc ) | |
| pic_alf_aps_id_chroma | u(3) |
| } | |
| } | |
| } | |
| quantization_PH_parameters( ) | |
| deblocking_filter_parameters( ) | |
| } | |
| if( sps_lmcs_enabled_flag ) { | |
| pic_lmcs_enabled_flag | u(1) |
| if( pic_lmcs_enabled_flag ) { | |
| pic_lmcs_aps_id | u(2) |
| if( ChromaArrayType != 0) | |
| pic_chroma_residual_scale_flag | u(1) |
| } | |
| } | |

TABLE 8-continued

| Partial Picture header | Descriptor |
|---|---|
| if( sps_scaling_list_enabled_flag ) { | |
| pic_scaling_list_present_flag | u(1) |
| if( pic_scaling_list_present_flag ) | |
| pic_scaling_list_aps_id | u(3) |
| } | |
| if( picture_header_extension_present_flag ) { | |
| ph_extension_length | ue(v) |
| for( i = 0; i < ph_extension_length; i++) | |
| ph_extension_data_byte[ i ] | u(8) |
| } | |
| rbsp_trailing_bits( ) | |
| } | |

Slice Header

The Slice header is transmitted at the beginning of each slice. The slice header table syntax currently contains 57 syntax elements. This is very large compared to the previous slice header in earlier versions of the standard. A complete description of all the slice header parameters 5 can be found in JVET_P2001-VE. Table 9 shows these parameters in the current picture header decoding syntax. In this simplified table version, some syntax elements have been grouped to make the table more readable.

TABLE 9

| Partial Slice header | Descriptor |
|---|---|
| slice header( ) { | |
| slice_pic_order_cnt_lsb | u(v) |
| if( subpics_present_flag ) | |
| slice_subpic_id | u(v) |
| if( rect_slice_flag \|\| Num_TilesInPic > 1 ) | |
| slice_address | u(v) |
| if( !rect_slice_flag && Num_TilesInPic > 1 ) | |
| num_tiles_in_slice_minus1 | ue(v) |
| slice_type | ue(v) |
| Slice_reference_picture_list_parameters( ) | |
| if( slice_type != I ) { | |
| if( cabac_init_present_flag ) | |
| cabac_init_flag | u(1) |
| if( pic_temporal_mvp_enabled_flag ) { | |
| if( slice_type = = B && !pps_collocated_from_10_idc ) | |
| collocated_from_l0_flag | u(1) |
| if( ( collocated_from_10_flag && NumRefIdxActive | |
| [ 0 ] > 1 ) | |
| ( !collocated_from_10_flag && | |
| NumRefIdxActive[ 1 ] >1)) | |
| collocated_ref_idx | ue(v) |
| } | |
| if( ( pps_weighted_pred_flag && slice_type == P ) \|\| | |
| ( pps_weighted_bipred_flag && slice_type == B) ) | |
| pred_weight_table( ) | |
| } | |
| slice_quantization_parameters( ) | |
| if( sps_sao_enabled_flag && | |
| !pic_sao_enabled_present_flag ) { | |
| slice_sao_luma_flag | u(1) |
| if( ChromaArrayType != 0 ) | |
| slice_sao_chroma_flag | u(1) |
| } | |
| if( sps_alf_enabled_flag && | |
| !pic_alf_enabled_present_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++) | |
| slice_alf_aps_id_luma[ i ] | u(3) |

TABLE 9-continued

| Partial Slice header | Descriptor |
|---|---|
| if( ChromaArrayType != 0 ) | |
| slice_alf_chroma_idc | u(2) |
| if( slice_alf_chroma_idc ) | |
| slice_alf_aps_id_chroma | u(3) |
| } | |
| } | |
| slice_deblocking_filter_parameters( ) | |
| if( entry_point_offsets_present_flag && NumEntryPoints > 0 ) { | |
| offset_len_minus1 | ue(v) |
| for( i = 0; i < NumEntryPoints; i++ ) | |
| entry_point_offset_minus1[ i ] | u(v) |
| } | |
| if( slice_header_extension_present_flag ) { | |
| slice_header_extension_length | ue(v) |
| for( i = 0; i < slice_header_extension_length; i++) | |
| slice_header_extension_data_byte[ i ] | u(8) |
| } | |
| byte_alignment( ) | |
| } | |

First the slice_pic_order_cnt_lsb is decoded to determine the POC of the current slice.

Then, the slice_subpic_id if needed, is decoded to determine the sub picture id of the current slice. Then the slice_address is decoded to determine the address of the current slice. The num_tiles_in_slice_minus1 is then decoded if the number of tiles in the current picture is greater than one.

Then the slice_type is decoded.

A set of Reference picture list parameters is decoded; these are similar to those in the picture header.

When the slice type is not intra and if needed the cabac_init_flag and/or the collocated_from_10_flag and the collocated_ref_idx are decoded. These data are related to the CABAC coding and the motion vector collocated.

In the same way, when the slice type is not Intra, the parameters of the weighted prediction pred_weight_table( ) are decoded.

In the slice_quantization_parameters( ), the slice_qp_delta is systematically decoded before other parameters of the QP offset if needed slice_cb_qp_offset, slice_cr_qp_offset, slice_joint_cbcr_qp_offset, cu_chroma_qp_offset_enabled_flag.

The enabled flags for SAO are decoded at the for both luma and chroma: slice_sao_luma_flag, slice_sao_chroma_flag if it was signaled in the picture header.

Then the APS ALF ID is decoded if needed, with similar data restriction as in the picture header.

Then the deblocking filter parameters are decoded before other data (slice_deblocking_filter_parameters( )).

As in the picture header the ALF APS ID is set at the end of the slice header.

APS in Picture Header

As depicted in Table 8, the APS ID information for the three tools ALF, LMCS and scaling list are at the end on the picture header syntax elements.

Streaming Applications

Some streaming applications only extract certain parts of the bitstream. These extractions can be spatial (as the sub-picture) or temporal (a subpart of the video sequence). Then these extracted parts can be merged with other bitstreams. Some other reduce the frame rate by extracting only some frames. Generally, the main aim of these streaming applications is to use the maximum of the allowed bandwidth to produce the maximum quality to the end user.

In VVC, the APS ID numbering has been limited for frame rate reduction, in order that a new APS id number for a frame can't be used for a frame at an upper level in the temporal hierarchy. However, for streaming applications which extract parts of the bitstream the APS ID needs to be tracked to determine which APS should be keep for a sub part of the bitstream as the frame (as IRAP) don't reset the numbering of the APS ID.

LMCS (Luma Mapping with Chroma Scaling)

The Luma Mapping with Chroma scaling (LMCS) technique is a sample value conversion method applied on a block before applying the loop filters in a video decoder like VVC.

The LMCS can be divided into two sub-tools. The first one is applied on Luma block while the second sub-tool is applied on Chroma blocks as described below:

1) The first sub-tool is an in-loop mapping of the Luma component based on adaptive piecewise linear models. The in-loop mapping of the Luma component adjusts the dynamic range of the input signal by redistributing the codewords across the dynamic range to improve compression efficiency. Luma mapping makes use of a forward mapping function into the "mapped domain" and a corresponding inverse mapping function to come back in the "input domain".
2) The second sub-tool is related to the chroma components where a luma-dependent chroma residual scaling is applied. Chroma residual scaling is designed to compensate for the interaction between the luma signal and its corresponding chroma signals. Chroma residual scaling depends on the average value of top and/or left reconstructed neighbouring luma samples of the current block.

Like most other tools in video coder like VVC, LMCS can be enabled/disabled at the sequence level using an SPS flag. Whether chroma residual scaling is enabled or not is also signalled at the slice level. If luma mapping is enabled, an additional flag is signalled to indicate if luma-dependent chroma residual scaling is enabled or not. When luma mapping is not used, luma-dependent chroma residual scaling is fully disabled. In addition, luma-dependent chroma residual scaling is always disabled for the chroma blocks whose size is less than or equal to 4.

Figure 7:
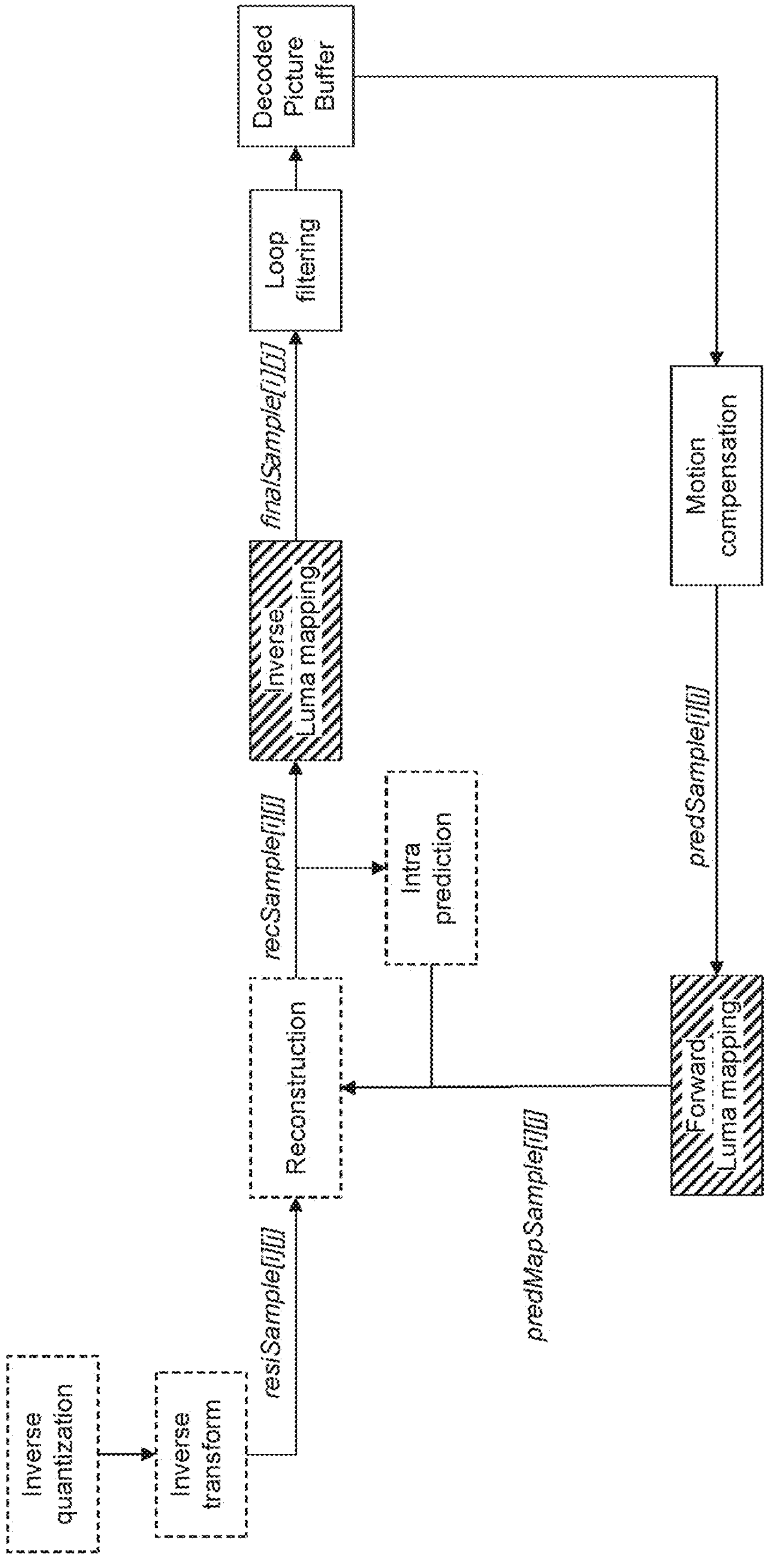
FIG. 7 illustrates Luma Modelling Chroma Scaling (LMCS)

FIG. 7 shows the principle of the LMCS as explained above for the Luma mapping sub-tool. The hatched blocks in FIG. 7 are the new LMCS functional blocks, including forward and inverse mapping of the luma signal. It is important to note that, when using LMCS, some decoding operations are applied in the "mapped domain". These operations are represented by blocks in dashed lines in this FIG. 7. They typically correspond to the inverse quantization, the inverse transform, the luma intra prediction and the reconstruction step which consists in adding the luma prediction with the luma residual. Conversely, the solid line blocks in FIG. 7 indicate where the decoding process is applied in the original (i.e., non-mapped) domain and this includes the loop filtering such as deblocking, ALF, and SAO, the motion compensated prediction, and the storage of decoded pictures as reference pictures (DPB).

Figure 8:
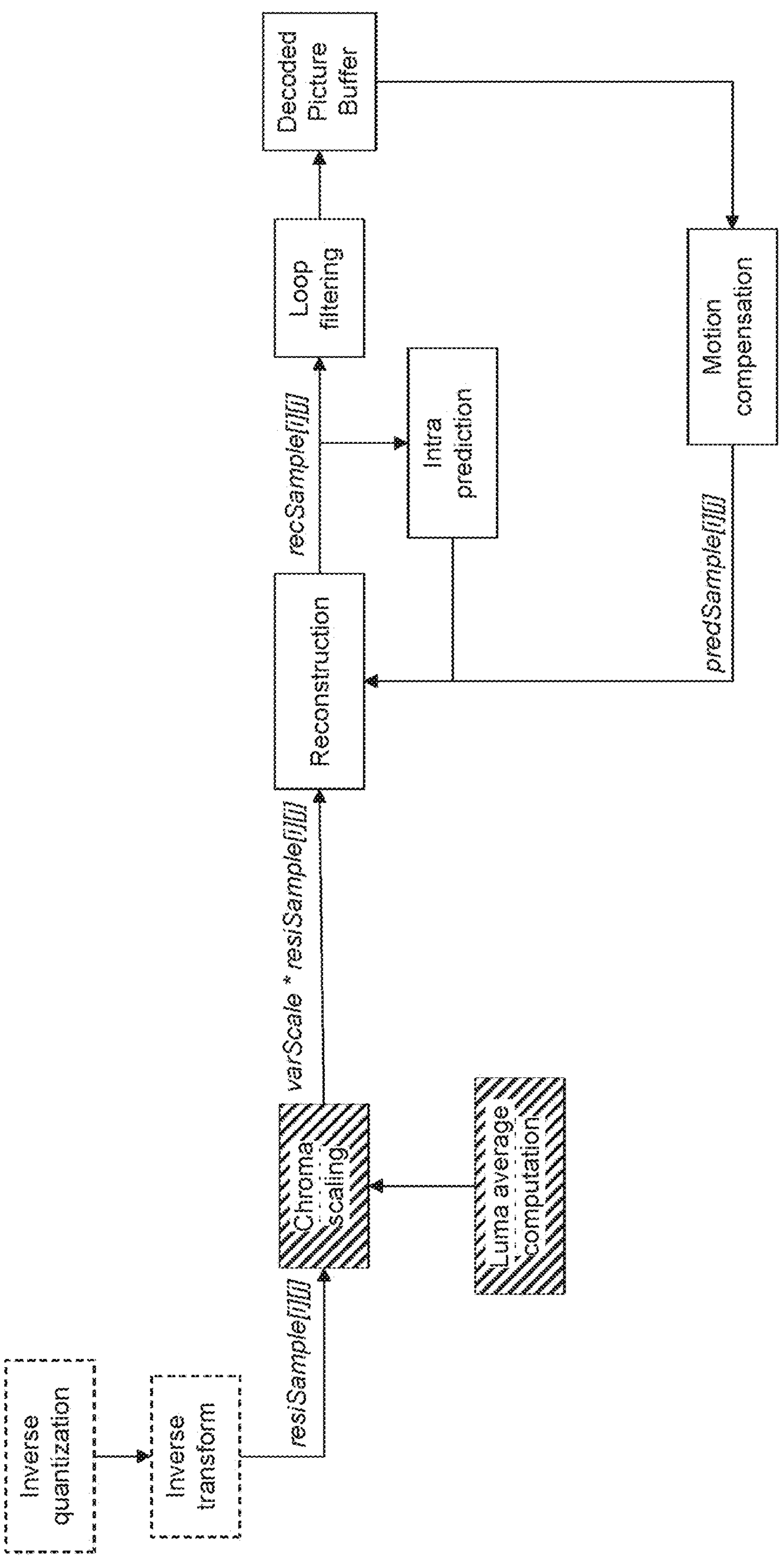
FIG. 8 shows a sub tool of LMCS.

FIG. 8 shows a similar diagram as FIG. 7 but this time this is for the Chroma scaling sub-tool of the LMCS tool. The hatched block in FIG. 8 is the new LMCS functional block which includes the luma-dependent chroma scaling process. However, in Chroma, there are some important differences compared to the Luma case. Here only the inverse quantization and the inverse transform represented by block in dash lines are performed in the "mapped domain" for the Chroma samples. All the other steps of Intra Chroma prediction, motion compensation, loop filtering are performed in the original domain. As depicted in FIG. 8, there is only a scaling process and there is no forward and inverse processing as for the Luma mapping.

Luma Mapping by Using Piece Wise Linear Model

The luma mapping sub-tool is using a piecewise linear model. It means that the piecewise linear model separates the input signal dynamic range into 16 equal sub-ranges, and for each sub-range, its linear mapping parameters are expressed using the number of codewords assigned to that range.

Semantics for Luma Mapping

The syntax element lmcs_min_bin_idx specifies the minimum bin index used in the luma mapping with chroma scaling (LMCS) construction process. The value of lmcs_min_bin_idx shall be in the range of 0 to 15, inclusive.
The syntax element lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15-lmcs_delta_max_bin_idx. The value of LmcsMaxBinIdx shall be greater than or equal to lmcs_min_bin_idx.
The syntax element lmcs_delta_cw_prec_minus1 plus 1 specifies the number of bits used for the representation of the syntax lmcs_delta_abs_cw[i].
The syntax element lmcs_delta_abs_cw[i] specifies the absolute delta codeword value for the ith bin.
The syntax element lmcs_delta_sign_cw_flag[i] specifies the sign of the variable lmcsDeltaCW[i]. When lmcs_delta_sign_cw_flag[i] is not present, it is inferred to be equal to 0.

LMCS Intermediate Variables Computation for Luma Mapping

In order to apply the forward and inverse Luma mapping processes, some intermediate variables and data arrays are needed.
First of all, the variable OrgCW is derived as follows:

OrgCW=(1<<BitDepth)/16

Then, the variable lmcsDeltaCW[i], with i=lmcs_min_bin_idx . . . LmcsMaxBinIdx, is computed as follows:

lmcsDeltaCW[*i*]=(1-2*lmcs_delta_sign_*cw*_flag[*i*])*lmcs_delta_abs_*cw*[*i*]

The new variable lmcsCW[i] is derived as follows:

For i=0 . . . lmcs_min_bin_idx−1, lmcsCW[i] is set equal 0.

For i=lmcs_min_bin_idx . . . LmcsMaxBinIdx, the following applies:

lmcsCW[i]=OrgCW+lmcsDeltaCW[i]

The value of lmcsCW[i] shall be in the range of (OrgCW>>3) to (OrgCW<<3−1), inclusive.

For i=LmcsMaxBinIdx+1 . . . 15, lmcsCW[i] is set equal 0.

The variable InputPivot [i], with i=0 . . . 16, is derived as follows:

InputPivot[*i*]=*i**OrgCW

The variable LmcsPivot[i] with i=0 . . . 16, the variables ScaleCoeff[i] and InvScaleCoeff[i] with i=0 . . . 15, are computed as follows:

```
LmcsPivot[ 0 ] = 0;
for( i = 0; i <= 15; i++ ) {
  LmcsPivot[ i + 1 ] = LmcsPivot[ i ] + lmcsCW[ i ]
  ScaleCoeff[ i ] = ( lmcsCW[ i ] * (1 << 11) + (1 << ( Log2( OrgCW ) − 1 ) ) ) >>
( Log2( OrgCW ) )
  if( lmcsCW[ i ] = = 0)
    InvScaleCoeff[ i ] = 0
  else
    InvScaleCoeff[ i ] = OrgCW * ( 1 << 11 ) / lmcsCW[ i ]
```

Forward Luma Mapping

As illustrated by FIG. 7 when the LMCS is applied for Luma, the Luma remapped sample called predMapSamples[i][j] is obtained from the prediction sample predSamples[i][j]. The predMapSamples[i][j] is computed as follows:

First of all, an index idx Y is computed from the prediction sample predSamples[i][j], at location (i, j)

idxY=predSamples[*i*][*j*]>>Log 2(OrgCW)

Then predMapSamples[i][j] is derived as follows by using the intermediate variables idxY, LmcsPivot[idxY] and InputPivot[idxY] of section 0:

$$predMapSamples[i][j] = LmcsPivot[idxY] + (ScaleCoeff[idxY] * (predSamples[i][j] - InputPivot[idxY]) + (1 << 10)) >> 11$$

Luma Reconstruction Samples

The reconstruction process is obtained from the predicted luma sample predMapSample[i][j] and the residual luma samples resiSamples[i][j].

The reconstructed luma picture sample recSamples[i][j] is simply obtained by adding predMapSample [i][j] to resiSamples[i][j] as follows:

$$recSamples[i][j] = Clip1\ (predMapSamples[i][j] * (resiSamples[i][j]])$$

In this above relation, the Clip 1 function is a clipping function to make sure that the reconstructed sample is between 0 and 1<<BitDepth−1.

Inverse Luma Mapping

When applying the inverse luma mapping according to FIG. 7, the following operations are applied on each sample recSample[i][j] of the current block being processed:

First of all, an index idx Y is computed from the reconstruction sample recSamples[i][j], at location (i,j)

$$idxY = recSamples[i][j] >> \text{Log2}\ (OrgCW)$$

The inverse mapped luma sample invLumaSample[i][j] is derived as follows based on the:

$$invLumaSample[i][j] = InputPivot[idxYInv] + (InvScaleCoeff[idxYInv] * (recSamples[i][j] - LmcsPivot[idxYInv]) + (1 << 10) >> 11$$

A clipping operation is then done to get the final sample:

$$finalSample[i][j] = Clip1\ (invLumaSample[i][j])$$

Chroma Scaling

LMCS Semantics for Chroma Scaling

The syntax element lmcs_delta_abs_crs in Table 6 specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

The syntax element lmcs_delta_sign_crs flag specifies the sign of the variable lmcsDeltaCrs. When not present, lmcs_delta_sign_crs_flag is inferred to be equal to 0.

LMCS Intermediate Variable Computation for Chroma Scaling

To apply the Chroma scaling process, some intermediate variables are needed.

The variable lmcsDeltaCrs is derived as follows:

$$lmcsDeltaCrs = (1 - 2 * \text{lmcs\_delta\_sign\_crs\_flag}) * \text{lmcs\_delta\_abs\_crs}$$

The variable ChromaScaleCoeff[i], with i=0 . . . 15, is derived as follows:

$$\text{if } (lmcsCW[i] == 0)$$
$$ChromaScaleCoeff[i] = (1 << 11)$$
$$\text{else}$$
$$ChromaScaleCoeff[i] = OrgCW * (1 << 11) / (lmcsCW[i] + lmcsDeltaCrs)$$

Chroma Scaling Process

In a first step, the variable invAvgLuma is derived in order to compute the average luma value of reconstructed Luma samples around the current corresponding Chroma block. The average Luma is computed from left and top luma block surrounding the corresponding Chroma block If not sample are available the variable invAvgLuma is set as follows: invAvgLuma=1<<(BitDepth−1)

Based on the intermediate arrays LmcsPivot[ ] of section 0, the variable idx YInv is then derived as follows:

```
For ( idx YInv = lmcs_min_bin_idx; idx YInv <= LmcsMaxBinIdx; idx YInv++ ) {
   if(invAvgLuma < LmcsPivot [ idx YInv + 1 ] )      break
}
Idx YInv = Min( idxYInv, 15 )
```

The variable varScale is derived as follows:

$$varScale = ChromaScaleCoeff[idxYInv]$$

When a transform is applied on the current Chroma block, the reconstructed Chroma picture sample array recSamples is derived as follows $$recSamples[i][j] = Clip1\ (predSamples[i][j] + \text{Sign}\ (resiSamples[i][j]) * ((\text{Abs}\ (resiSamples[i][j]) * varScale + (1 << 10)) >> 11))$$

If no transform has been applied for the current block, the following applies:

$$recSamples[i][j] = Clip1\ (predSamples[i][j])$$

Encoder Consideration

The basic principle of an LMCS encoder is to first assign more codewords to ranges where those dynamic range segments have lower codewords than the average variance.

In an alternative formulation of this, the main target of LMCS is to assign fewer codewords to those dynamic range segments that have higher codewords than the average variance. In this way, smooth areas of the picture will be coded with more codewords than average, and vice versa. All the parameters (see Table 6) of the LMCS tools which are stored in the APS are determined at the encoder side. The LMCS encoder algorithm is based on the evaluation of local luma variance and is optimizing the determination of the LMCS parameters according to the basic principle described above. The optimization is then conducted to get the best PSNR metrics for the final reconstructed samples of a given block.

As will be discussed below, parsing complexity can be reduced by setting the APS ID information at the beginning of the slice/picture header. This allows for syntax elements relating to APS ID to be parsed before syntax elements relating to decoding tools.

Picture Header

The following description provides details or alternatives of the following table of syntax elements for the picture header. Table 10 shows an example modification of the picture header (see Table 8 above) where the APS ID information for LMCS, ALF and Scaling list are set close to the beginning of the picture header to solve the parsing problem of the prior art. This change is shown by strike-through and underlined text. With this table of syntax elements, the tracking of the APS ID has a lower complexity.

TABLE 10

Partial Picture header showing modification of APS ID information

| | Descriptor |
|---|---|
| picture_header_rbsp( ) { | |
| non_reference_picture_flag | u(1) |
| gdr_pic_flag | u(1) |
| no_output_of_prior_pics_flag | u(1) |
| if( gdr_pic_flag ) | |
| recovery_poc_cnt | ue(v) |
| if( sps_alf_enabled_flag ) { | |
| pic_alf_enabled_present_flag | u(1) |
| if( pic_alf_enabled_present_flag ) { | |
| pic_alf_enabled_flag | u(1) |
| if( pic_alf_enabled_flag ) { | |
| pic_num_alf_aps_ids_luma | u(3) |
| for( i = 0; i < pic_num_alf_aps_ids_luma; i++ ) | |
| pic_alf_aps_id_luma[ i ] | u(3) |
| if( ChromaArrayType != 0 ) | |
| pic_alf_chroma_idc | u(2) |
| if( pic_alf_chroma_idc ) | |
| pic_alf_aps_id_chroma | u(3) |
| } | |
| } | |
| } | |
| if( sps_lmcs_enabled_flag ) { | |
| pic_lmcs_enabled_flag | u(1) |
| if( pic_lmcs_enabled_flag ) { | |
| pic_lmcs_aps_id | u(2) |
| if( ChromaArrayType != 0 ) | |
| pic_chroma_residual_scale_flag | u(1) |
| } | |
| } | |
| if( sps_scaling_list_enabled_flag ) { | |
| pic_scaling_list_present_flag | u(1) |
| if( pic_scaling_list_present_flag ) | |
| pic_scaling_list_aps_id | u(3) |
| } | |
| PPS_parameters( ) | |
| Subpic_parameter( ) | |
| if( separate_colour_plane_flag = = 1 ) | |
| colour_plane_id | u(2) |
| if( output_flag_present_flag ) | |
| pic_output_flag | u(1) |
| reference_picture_list_parameters( ) | |
| partitioning_parameters( ) | |
| Delta_QP_Parameters( ) | |
| Motion_information_Parameters( ) | |
| if( sps_joint_cbcr_enabled_flag ) | |
| pic_joint_cbcr_sign_flag | u(1) |
| SAO_parameters( ) | |
| ~~if( sps_alf_enabled_flag ) {~~ | |
| ~~**pic_alf_enablec_present_flag**~~ | ~~u(1)~~ |
| ~~if( pic_alf_enablec_present_flag ) {~~ | |
| ~~**pic_alf_enabled_flag**~~ | ~~u(1)~~ |
| ~~if( pic_alf_enabled_flag ) {~~ | |
| ~~**pic_num_alf_ap:_ids_luma**~~ | ~~u(3)~~ |
| ~~for( i = 0; i < pic_num_alf_aps_ids_luma; i++ )~~ | |
| ~~**pic_alf_aps_id_luma**[ i ]~~ | ~~u(3)~~ |
| ~~if( ChromaArrayType != 0 )~~ | |

TABLE 10-continued

| Partial Picture header showing modification of APS ID information | |
|---|---|
| | Descriptor |
| ~~pic_alf_chroma_idc~~ | ~~u(2)~~ |
| ~~if( pic_alf_chroma_idc )~~ | |
| ~~pic_alf_aps_id_chroma~~ | ~~u(3)~~ |
| ~~}~~ | |
| ~~}~~ | |
| ~~}~~ | |
| quantization_PH_parameters( ) | |
| deblocking_filter_parameters( ) | |
| } | |
| ~~if( sps_lmcs_enabled_flag ) {~~ | |
| ~~pic_lmcs_enabled_flag~~ | ~~u(1)~~ |
| ~~if( pic_lmcs_enabled_flag ) {~~ | |
| ~~pic_lmcs_aps_id~~ | ~~u(2)~~ |
| ~~if(ChromaArrayType != 0 )~~ | |
| ~~pic_chroma_residual_scale_flag~~ | ~~u(1)~~ |
| ~~}~~ | |
| ~~}~~ | |
| ~~if( sps_scaling_list_enabled_flag ) {~~ | |
| ~~pic_scaling_list_present_flag~~ | ~~u(1)~~ |
| ~~if( pic_scaling_list_present_flag )~~ | |
| ~~pic_scaling_list_aps_id~~ | ~~u(3)~~ |
| ~~}~~ | |
| if( picture_header_extension_present_flag ) { | |
| ph_extension_length | ue(v) |
| for( i = 0; i < ph_extension_length; i++) | |
| ph_extension_data_byte[ i ] | u(8) |
| } | |
| rbsp_trailing_bits( ) | |
| } | |

The APS ID related syntax elements may include one or more of:

- APS ID LMCS.
- APS ID scaling list.
  - the APS scaling list containing information to enable the scaling matrix for the LNST method.
- APS ID ALF list.
  - the APS ALF list containing information related to the signaling of clipping values In one example, the APS ID related syntax elements are set at, or near to, the beginning of the picture header.

The advantage of this feature is a complexity reduction for streaming applications which need to track the APS ID usage to remove non useful APS NAL Units.

As discussed above, the wording 'beginning' does not necessarily mean 'the very beginning' as some syntax elements may come before the APS ID related syntax elements. These are discussed in turn below.

The set of APS ID related syntax elements are set after one or more of:

- syntax elements useful for streaming applications which need to parse the bitstream in order to cut or to split or to extract parts of video sequences without parse tools parameters.
- a syntax element indicating that the current picture is never used as a reference picture (e.g. non_reference_picture_flag) which indicates, when equal to 1, that the picture is never used as a reference picture. This information is useful for many streaming applications, so it is preferable to set this flag before the set of APS ID LMCS syntax elements.
- a syntax element indicating that the current picture is a gradual decoding refresh picture (e.g. gdr_pic_flag syntax) which indicates, when equal to 1, that the current picture is a GDR picture. As this type of pictures implies that the bitstream is independent from the previous pictures. It is an important information for many streaming applications. For the same reason, the APS ID LMCS syntax elements set should be after the recovery_poc_cnt syntax element which is decoded if the gdr_pic_flag is enabled.
- a syntax element indicating a change in the previously decoded pictures in the decoding picture buffer (e.g. no_output_of_prior_pics_flag) which affects the Decoded Picture Buffer (DBP). This is an important information for many applications.
- ph_pic_parameter_set_id and/or the other syntax elements related to the PPS information. Indeed, the PPS id are needed for many applications.
- syntax elements related to the sub-picture information. Indeed, these pieces of information are important for bitstream extraction for some streaming applications.
- a picture type information transmitted in the picture header. Indeed, the picture type is an important information for many applications.

In a particularly advantageous example, the set of APS ID related syntax elements are set after syntax elements at the beginning of the picture header which have a fix length codeword without condition for their decoding. The fix length codeword corresponds to the syntax elements with a descriptor u(N), in the table of syntax element, where N is an integer value.

Compared to the current VVC specification it corresponds to the non_reference_picture_flag, gdr_pic_flag and the no_output_of_prior_pics_flag flags.

The advantage of this is for streaming applications which can easily bypass these first codewords as the number of bits is always the same at the beginning of the picture header and goes directly to the useful information for the corresponding application. As such, the decoder can directly parse the APS ID related syntax elements from the header as it is always in the same bit location in the header.

In a variant which reduces parsing complexity, the set of APS ID related syntax elements is set after syntax elements at the beginning of the picture header which don't require one or more values from another header. The parsing of such syntax elements don't need other variables for their parsing which reduces the complexity of the parsing.

In one variant, the APS ID scaling list syntax elements set is set at the beginning of the picture header.

The advantage of this variant is a complexity reduction for streaming applications which need to track the APS ID usage to remove non-useful APS NAL Units.

It should be appreciated that the above types of APS ID related syntax elements can be treated individually or in combination. A non-exhaustive list of particularly advantageous combinations are discussed in below.

The APS ID LMCS syntax elements set and the APS ID scaling list syntax elements set are set at, or near to, the beginning of the picture header and optionally after the useful information for streaming applications The APS ID LMCS syntax elements set and the APS ID ALF syntax elements set are set at the beginning of the picture header and optionally after the useful information for streaming applications The APS ID LMCS syntax elements set, the APS ID scaling list syntax elements set and the APS ID ALF syntax elements set are set at, or near to, the beginning of the picture header and optionally after the useful information for streaming applications In one embodiment, the APS ID related syntax elements (APS LMCS, APS scaling list, and/or APS ALF) are set before low level tools parameters.

This affords a decrease of complexity for some streaming applications which need to track the different APS ID for each picture. Indeed, the information related to low level tools are needed for the parsing and decoding of the slice data but not needed for such applications which only extract bitstream without decoding. Examples of the low-level tools are provided blow:

- the set of deblocking filter parameters; these parameters are for the deblocking filter which is only needed for slice data decoding. the set of quantization parameters; these parameters are needed for slice data parsing and decoding.
- the set of SAO parameters; these parameters are needed for slice data parsing and decoding.
- the pic_joint_cbcr_sign_flag flag; these parameters are needed for slice data parsing and decoding.
- the set of motion parameters; these parameters are needed for slice data parsing and decoding.
- the set of QP offset parameters; these parameters are needed for slice data parsing and decoding.
- the set of partitioning parameters; these parameters are needed for slice data parsing and decoding.
- the set of reference picture list parameters; these parameters are needed for slice data parsing and decoding.
- the pic_output_fl flag; these parameters are needed for slice data decoding.
- the colour_plane_id flag; these parameters are needed for slice data parsing and decoding.

It should be appreciated that the above types of APS ID related syntax elements can be treated individually or in combination. A non-exhaustive list of particularly advantageous combinations are discussed in below.

The APS ID LMCS syntax elements set and the APS ID scaling list syntax elements set are set at before low level tools syntax elements.

The APS ID LMCS syntax elements set and the APS ID ALF syntax elements set are set at before low level tools syntax elements.

The APS ID LMCS syntax elements set, the APS ID scaling list syntax elements set and the APS ID ALF syntax elements set are set at before low level tools syntax elements.

Resynchronization Pictures

In a bitstream there are some resynchronization frames or slices. By using these frames, a bitstream can be read without taking into account the previous decoding information. For example, the Clean random access picture (CRA picture) doesn't refer to any picture other than itself for inter prediction in its decoding process. This means that the slice of this picture is Intra or IBC. In VVC, a CRA picture is an IRAP (Intra Random Access Point) picture for which each VCL NAL unit has nal unit_type equal to CRA_NUT.

In VVC, these resynchronization frames can be IRAP pictures or GDR pictures. However, the IRAP or GDR pictures, or IRAP slices for some configurations, may have APS ID in their picture header which originate from previously decoded APS. So, the APS ID should be tracked for a real random access point, or when the bitstream is split.

One way of ameliorating this problem is, when an IRAP or a GDR picture is decoded, all APS ID are reset and/or no APS is allowed to be taken from another decoded APS. The APS can be for LMCS or scaling list or ALF. The decoder thus determines whether the picture relates to a resynchronisation process, and if so, the decoding comprises resetting the APS ID.

In a variant, when one slice in a picture is an IRAP, all APS IDs are reset.

A reset of APS ID means that the decoder considers that all previous APS are non-valid anymore and consequently no APS ID value refer to previous APS.

This resynchronization process is particularly advantageous in combination with the above syntax structure as APS ID information can be more easily parsed and decoded-leading to quicker and more efficient resynchronisation when needed.

APS ID Related Information in Slice Header

The following description related to a modification to the table of syntax elements for at the slice header. In this table the APS ID information for ALF are set close to the beginning of the slice header to solve the parsing problem discussed above invention. The modified slice header in Table 11 is based on the description of the current slice header of syntax elements (see Table 9 above) with modifications shown in strikethrough and underline.

TABLE 11

| Partial Slice header showing modifications | |
|---|---|
| | Descriptor |
| slice_header( ) { | |
| slice_pic_order_cnt_lsb | u(v) |
| if( subpics_present_flag ) | |
| slice_subpic_id | u(v) |
| if( rect_slice_flag \|\| NumTilesInPic > 1 ) | |
| slice_address | u(v) |
| if( !rect_slice_flag && NumTilesInPic > 1 ) | |
| num_tiles_in_slice_minus1 | ue(v) |
| slice_type | ue(v) |
| if( sps_alf_enabled_flag && !pic_alf_enabled_present_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ | |
| slice_alf_aps_id_luma[ i ] | u(3) |
| if( ChromaArrayType != 0) | |
| slice_alf_chroma_idc | u(2) |
| if( slice_alf_chroma_idc ) | |
| slice_alf_aps_id_chroma | u(3) |
| } | |
| } | |
| Slice_reference_picture_list_parameters( ) | |
| if( slice_type != I ) { | |
| if( cabac_init_present_flag ) | |
| cabac_init_flag | u(1) |
| if( pic_temporal_mvp_enabled_flag ) { | |
| if( slice_type = = B && !pps_collocated_from_10_idc ) | |
| collocated_from_10_flag | u(1) |
| if( ( collocated_from_10_flag && NumRefIdxActive[ 0 ] > 1) \|\| | |
| ( !collocated_from_10_flag && NumRefIdxActive[ 1 ] > 1 ) ) | |
| collocated_ref_idx | ue(v) |
| } | |
| if( ( pps_weighted_pred_flag && slice_type = = P ) \|\| | |
| ( pps_weighted_bipred_flag && slice_type = = B) ) | |
| pred_weight_table( ) | |
| } | |
| slice_quantization_parameters( ) | |
| if( sps_sao_enabled_flag && !pic_sao_enabled_present_flag ) { | |
| slice_sao_luma_flag | u(1) |
| if( ChromaArrayType != 0 ) | |
| slice_sao_chroma_flag | u(1) |
| } | |
| ~~if( sps_alf_enabled_flag && !pic_alf_enabled_presen_flag ) {~~ | |
| ~~**slice_alf_enabled_flag**~~ | ~~u(1)~~ |
| ~~if( slice_alf_enabled_flag ) {~~ | |
| ~~**slice_num_alf_aps_ids_luma**~~ | ~~u(3)~~ |
| ~~for( i = 0; i < slice_num_alf_aps_ids_luma i++ )~~ | |
| ~~**slice_alf_aps_id_luma**[ i ]~~ | ~~u(3)~~ |
| ~~if( ChromaArrayType != 0 )~~ | |
| ~~**slice_alf_chroma_idc**~~ | ~~u(2)~~ |
| ~~if( slice_alf_chroma_idc )~~ | |
| ~~**slice_alf_aps_id_chroma**~~ | ~~u(3)~~ |
| ~~}~~ | |
| ~~}~~ | |
| slice_deblocking_filter_parameters( ) | |
| if( entry_point_offsets_present_flag && NumEntryPoints > 0 ) { | |
| offset_len_minus1 | ue(v) |
| for( i = 0; i < NumEntryPoints; i++ ) | |
| entry_point_offset_minus1[ i ] | u(v) |
| } | |
| if( slice_header_extension_present_flag ) { | |
| slice_header_extension_length | ue(v) |
| for( i = 0; i < slice_header_extension_length; i++) | |
| slice_header_extension_data_byte[ i ] | u(8) |
| } | |
| byte_alignment( ) | |
| } | |

APS ID ALF at the Beginning of the Slice Header

As shown in Table 11, the APS ID ALF syntax elements set is set at, or near to, the beginning of the slice header. In particular the ALF APS contains at least a syntax element related to the signalling of clipping values.

This affords a complexity reduction for streaming applications which need to track the APS ID usage to remove non useful APS NAL Units.

The set of APS ID ALF syntax elements may be set after syntax elements useful for streaming applications which need to parse or to cut or to split or to extract parts of video sequences without parse tools parameters. Examples of such syntax elements are provided below:

- the slice_pic_order_cnt_lsb syntax element which indicates POC of the current slice. This information is useful for many streaming applications, so it is preferable to set this flag before the set of APS ID ALF syntax elements.
- the slice_subpic_id syntax element which indicates the sub-picture ID of the current slice. This information is useful for many streaming applications, so it is preferable to set this flag before the set of APS ID ALF syntax elements.
- the slice_address syntax element which indicates the address of the slice. This information is useful for many streaming applications, so it is preferable to set this flag before the set of APS ID ALF syntax elements.
- the num_tiles_in_slice_minus syntax element. This information is useful for many streaming applications, so it is preferable to set this flag before the set of APS ID ALF syntax elements.
- the slice_type element which indicates the type of the current slice This information is useful for many streaming applications, so it is preferable to set this flag before the set of APS ID ALF syntax elements.

In a further variant, the APS ID ALF syntax elements set is set before low level tools parameters in the slice header when the ALF APS contains at least a syntax element related to the signalling of clipping values.

This affords a decrease of complexity for some streaming applications which need to track the different APS ALF APS ID for each picture. Indeed, the information related to low level tools are needed for the parsing and decoding of the slice data but not needed for such applications which only extract bitstream without decoding. Examples of such syntax elements are provided below:

- the set of reference picture list parameters in the slice header. Indeed these parameters are needed for slice data decoding.
- the set of CABAC initialisation flag in the slice header. Indeed this flag is only for slice data decoding.
- the set of collocated prediction parameters in the slice header. Indeed these parameters are needed for slice data decoding.
- the set of Weighted prediction parameters in the slice header. Indeed these parameters are needed for slice data decoding.
- the set of Quantization parameter update parameters in the slice header. Indeed these parameters are needed for slice data decoding.
- the set of SAO enabled flags in the slice header. Indeed these parameters are needed for slice data decoding.

It should be appreciated that the above features may be provided in combination with one-another. As with the specific combination discussed above, doing so may provide specific advantages suited to a specific implementation; for example increased flexibility, or specifying a 'worst-case' example. In other examples, complexity requirements may have a higher priority than rate reduction (for example) and as such a feature may be implemented individually.

Implementation of the Invention

Figure 9:
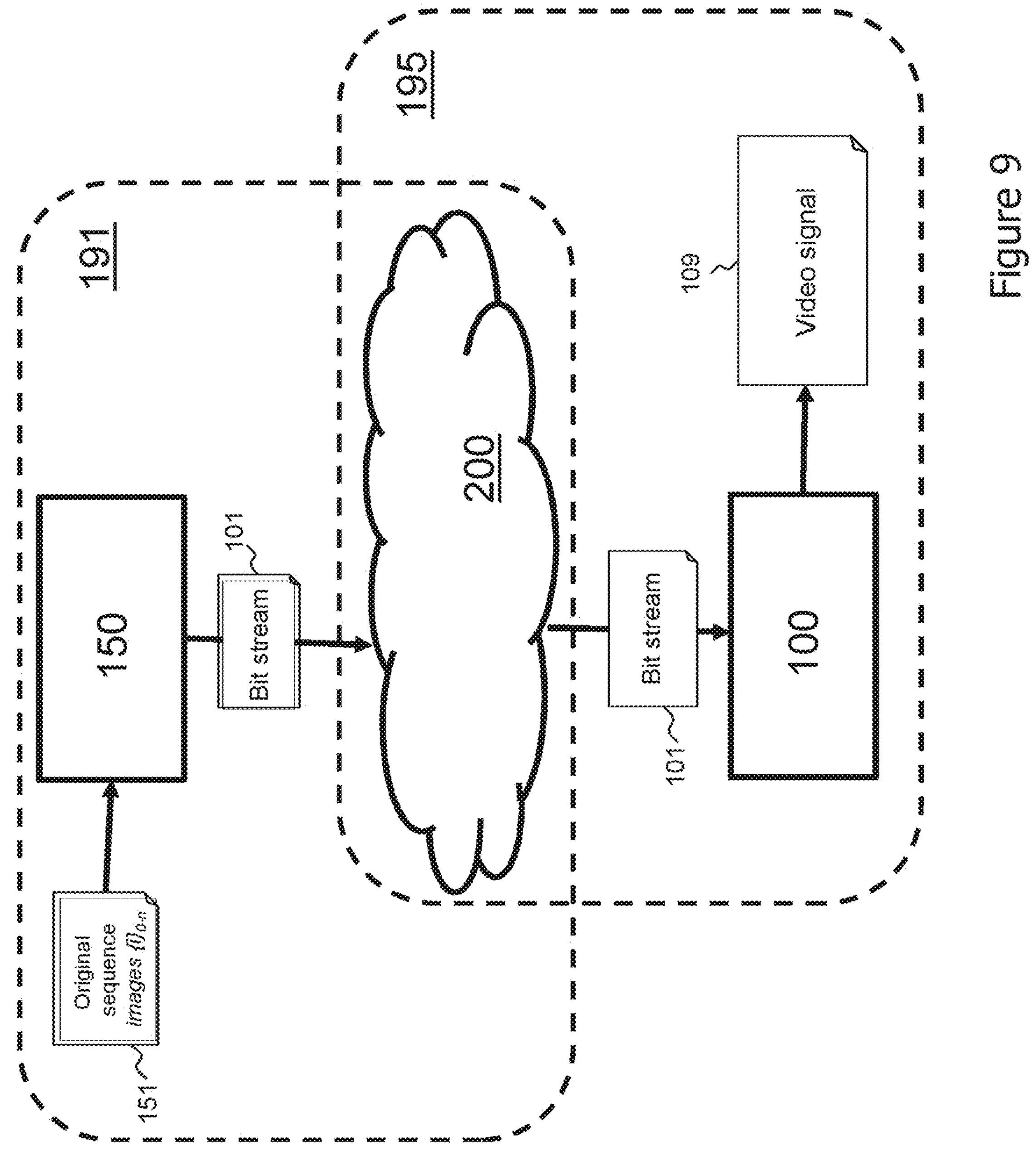
FIG. 9 is a diagram showing a system comprising an encoder or a decoder and a communication network according to embodiments of the present invention.

FIG. 9 shows a system 191 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (provided/streamed) content to the user. The system 195 obtains/receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 10:
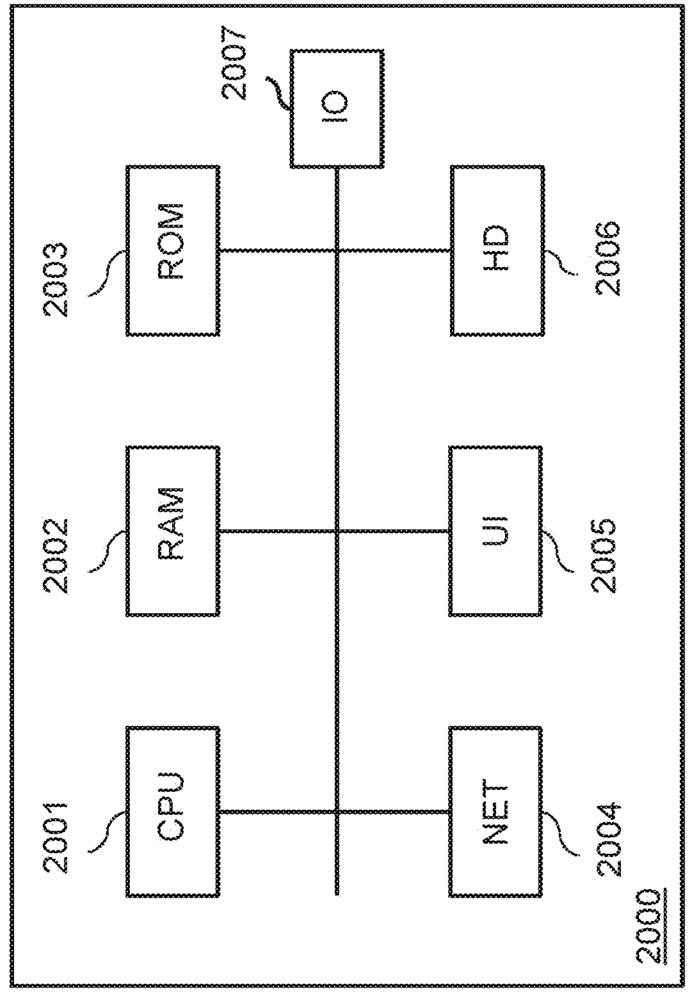
FIG. 10 is a schematic block diagram of a computing device for implementation of one or more embodiments of the invention.

FIG. 10 is a schematic block diagram of a computing device 1300 for implementation of one or more embodiments of the invention. The computing device 1300 may be a device such as a micro-computer, a workstation or a light portable device. The computing device 1300 comprises a communication bus connected to:—a central processing unit (CPU) 1301, such as a microprocessor;—a random access memory (RAM) 1302 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;—a read only memory (ROM) 1303 for storing computer programs for implementing embodiments of the invention;—a network interface (NET) 1304 is typically connected to a communication network over which digital data to be processed are transmitted or received. The network interface (NET) 1304 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1301;—a user interface (UI) 1305 may be used for receiving inputs from a user or to display information to a user;—a hard disk (HD) 1306 may be provided as a mass storage device;—an Input/Output module (IO) 1307 may be used for receiving/sending data from/to external devices such as a video source or display. The executable code may be stored either in the ROM 1303, on the HD 1306 or on a removable digital medium such as, for example a disk. According to a variant, the executable code of the programs can be received by means of a communication network, via the NET 1304, in order to be stored in one of the storage means of the communication device 1300, such as the HD 1306, before being executed. The CPU 1301 is adapted to control and direct the execution of the instructions or portions of software code of the program or programs according to embodiments of the invention, which instructions are stored in one of the aforementioned storage means. After powering on, the CPU 1301 is capable of executing instructions from main RAM memory 1302 relating to a software application after those instructions have been loaded from the program ROM 1303 or the HD 1306, for example. Such a software application, when executed by the CPU 1301, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 11 and 12.

Network Camera

Figure 11:
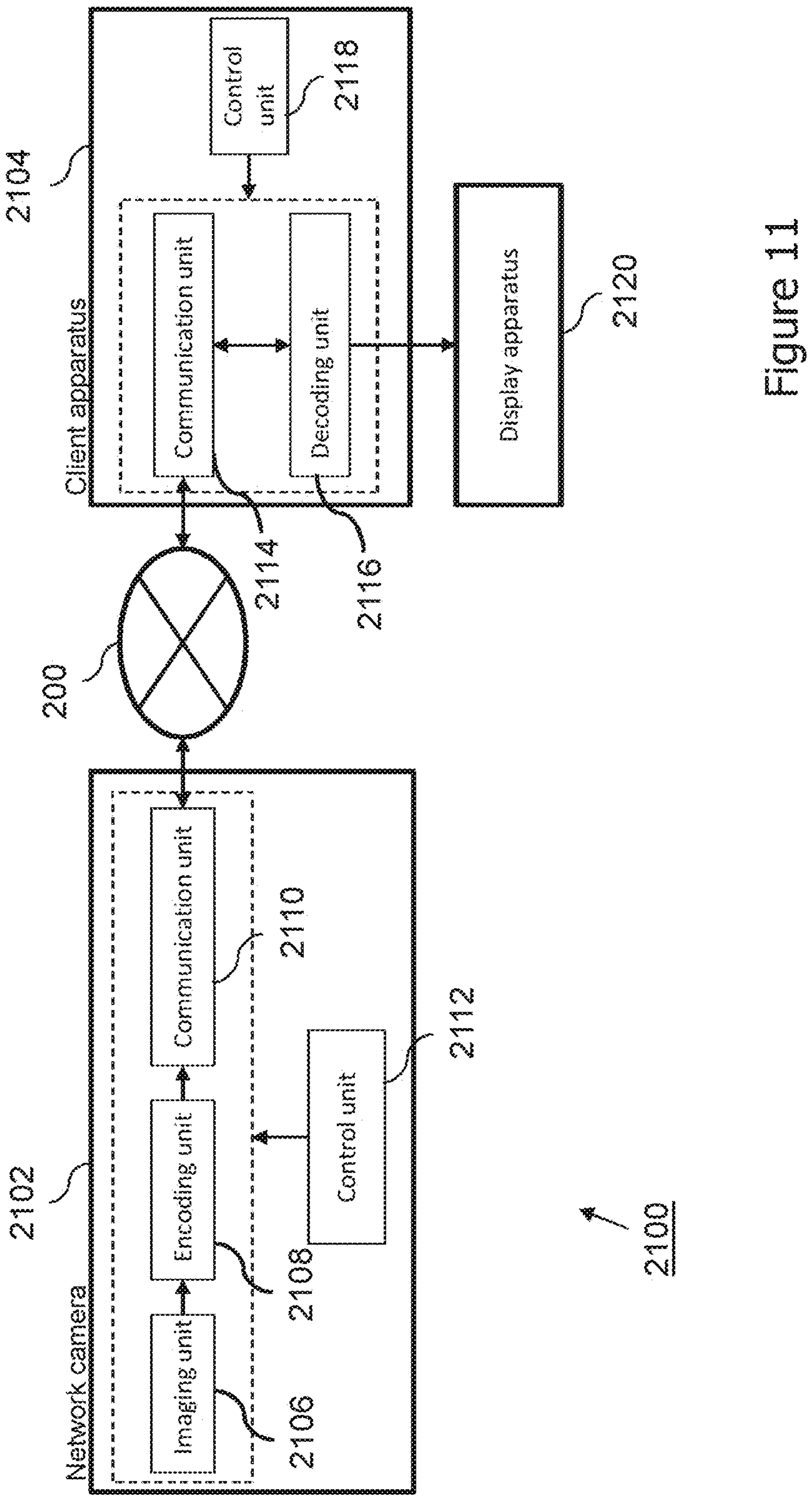
FIG. 11 is a diagram illustrating a network camera system.

FIG. 11 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image.

The encoding unit 2108 encodes the image data by using said encoding methods described above The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2114 of the client apparatus 2104 transmits the commands to the network camera 2102.

Further, the communication unit 2114 of the client apparatus 2104 receives the encoded image data from the network camera 2102.

The decoding unit 2116 decodes the encoded image data by using said decoding methods described above.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 includes the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2119 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

Smart Phone

Figure 12:
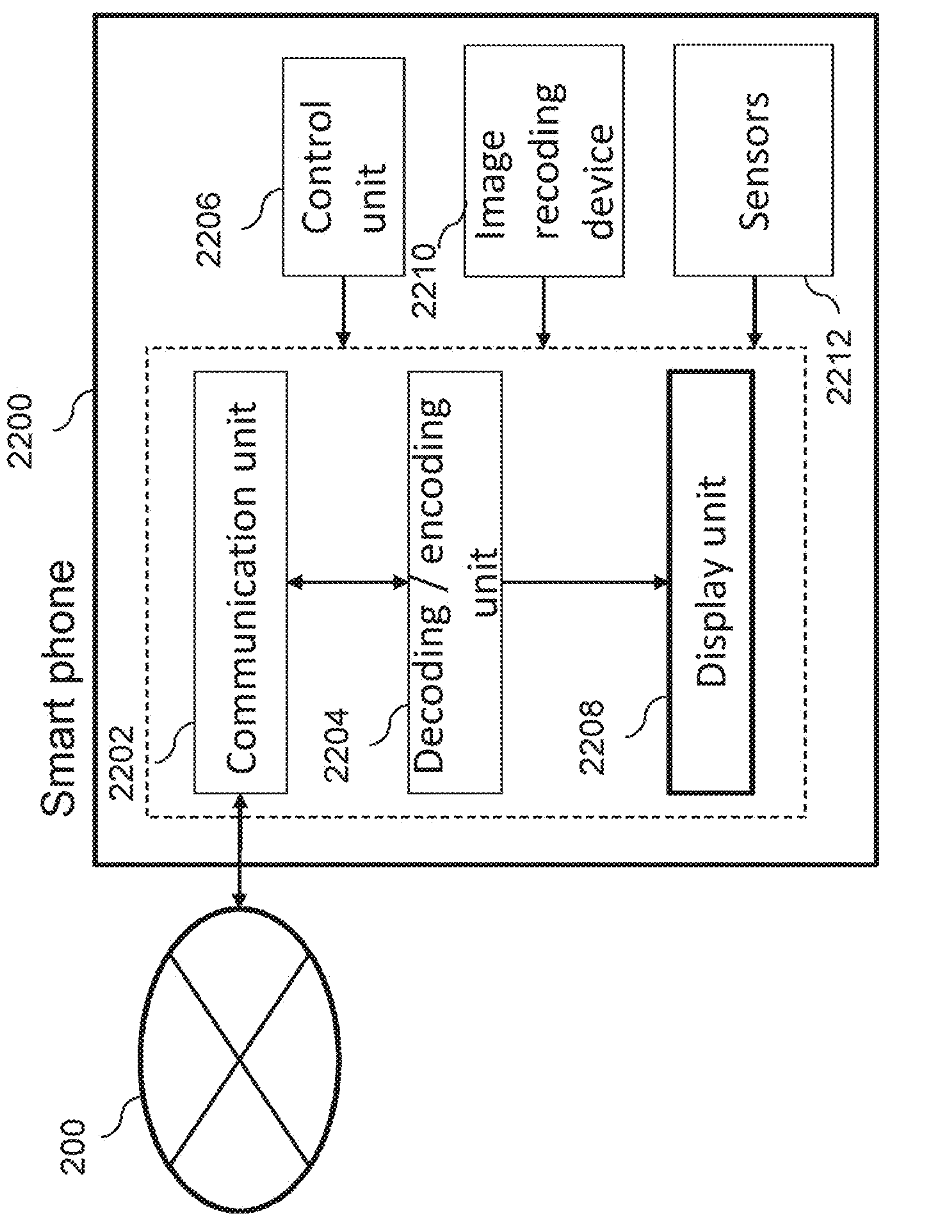
FIG. 12 is a diagram illustrating a smart phone.

FIG. 12 is a diagram illustrating a smart phone 2200.

The smart phone 2200 includes a communication unit 2202, a decoding unit 2204, a control unit 2206, display unit 2208, an image recording device 2210 and sensors 2212.

the communication unit 2202 receives the encoded image data via network 200.

The decoding unit 2204 decodes the encoded image data received by the communication unit 2202.

The decoding unit 2204 decodes the encoded image data by using said decoding methods described above.

The control unit 2206 controls other units in the smart phone 2200 in accordance with a user operation or commands received by the communication unit 2202.

For example, the control unit 2206 controls a display unit 2208 so as to display an image decoded by the decoding unit 2204.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding a bitstream, wherein the bitstream comprises a picture header comprising a syntax element to be applied to all slices of a picture, the method comprising:

decoding, from the picture header, (a) a first syntax element specifying an ID of an Adaptation Parameter Set (APS) of Adaptive Loop Filter (ALF) and (b) a second syntax element specifying an ID of an APS of Luma Mapping with Chroma Scaling (LMCS), prior to decoding a syntax element related to SAO from the picture header, wherein the first syntax element is decoded from the picture header before the second syntax element is decoded from the picture header; and decoding said bitstream using a decoded syntax element.

2. A method of encoding video data into a bitstream, wherein the bitstream comprises a picture header comprising a syntax element to be applied to all slices of a picture, the method comprising:

encoding, into the picture header, (a) a first syntax element specifying an ID of an Adaptation Parameter Set (APS) of Adaptive Loop Filter (ALF) and (b) a second syntax element specifying an ID of an APS of Luma Mapping with Chroma Scaling (LMCS), prior to encoding a syntax element relating to SAO into the picture header, wherein the first syntax element is encoded into the picture header before the second syntax element is encoded into the picture header.

3. The method according to claim 1, wherein the first syntax element and the second syntax element in the picture header are after a syntax element, in the picture header, being capable of indicating that a current picture is never used as a reference picture.

4. The method according to claim 1, wherein the first syntax element and the second syntax element in the picture header are after a syntax element, in the picture header, being capable of indicating that a current picture is a gradual decoding refresh picture.

5. The method according to claim 1, wherein the first syntax element and the second syntax element in the picture header are after picture type information in the picture header.

6. The method according to claim 1, wherein the first syntax element and the second syntax element in the picture header are after a ph_pic_parameter_set_id in the picture header.

7. The method according to claim 1, wherein the APS of ALF contains information related to the signaling of clipping values.

8. The method according to claim 1, wherein SAO corresponds to a loop filtering process which is capable of modifying pixel values of reconstructed pixels, and the syntax element related to SAO is an enabled flag for SAO.

9. A decoder for decoding a bitstream, wherein the bitstream comprises a picture header comprising a syntax element to be applied to all slices of a picture, wherein the decoder comprises:

a unit configured to decode, from the picture header, (a) a first syntax element specifying an ID of an Adaptation Parameter Set (APS) of Adaptive Loop Filter (ALF) and (b) a second syntax element specifying an ID of an APS of Luma Mapping with Chroma Scaling (LMCS), prior to decoding a syntax element relating to SAO from the picture header, wherein the first syntax element is decoded from the picture header before the second syntax element is decoded from the picture header; and wherein the unit is configured to decode said bitstream using said decoded syntax element.

10. An encoder for encoding video data into a bitstream, wherein the bitstream comprises a picture header comprising a syntax element to be applied to all slices of a picture, wherein the encoder comprises:

a unit configured to encode, into the picture header, (a) a first syntax element specifying an ID of an Adaptation Parameter Set (APS) of Adaptive Loop Filter (ALF) and (b) a second syntax element specifying an ID of an Adaptation Parameter Set (APS) of Luma Mapping with Chroma Scaling (LMCS), prior to encoding a syntax element relating to SAO into the picture header, wherein the first syntax element is encoded into the picture header before the second syntax element is encoded into the picture header.

11. A non-transitory computer readable storage medium storing a program for causing a computer to execute a method of decoding a bitstream, wherein the bitstream comprises a picture header comprising a syntax element to be applied to all slices of a picture, wherein the method comprises:

decoding, from the picture header, (a) a first syntax element specifying an ID of an Adaptation Parameter Set (APS) of Adaptive Loop Filter (ALF) and (b) a second syntax element specifying an ID of an APS of Luma Mapping with Chroma Scaling (LMCS), prior to decoding a syntax element related to SAO from the picture header, wherein the first syntax element is decoded from the picture header before the second syntax element is decoded from the picture header; and decoding said bitstream using a decoded syntax element.

12. A non-transitory computer readable storage medium storing a program for causing a computer to execute a method of encoding video data into a bitstream, wherein the bitstream comprises a picture header comprising a syntax element to be applied to all slices of a picture, the method comprising:

encoding, into the picture header, (a) a first syntax element specifying an ID of an Adaptation Parameter Set (APS) of Adaptive Loop Filter (ALF) and (b) a second syntax element specifying an ID of an APS of Luma Mapping with Chroma Scaling (LMCS), prior to encoding a syntax element relating to SAO into the picture header, wherein the first syntax element is encoded into the picture header before the second syntax element is encoded into the picture header.

* * * * *